US012379150B2

(12) United States Patent
Hellwig et al.

(10) Patent No.: US 12,379,150 B2
(45) Date of Patent: Aug. 5, 2025

(54) METHOD FOR DETERMINING AN ACTUATION OF A DOOR OF A HOUSEHOLD APPLIANCE BY A USER, APPARATUS FOR THIS PURPOSE AND ALSO HOUSEHOLD APPLIANCE HAVING THE APPARATUS

(71) Applicant: BSH Hausgeräte GmbH, Munich (DE)

(72) Inventors: Peter Hellwig, Dischingen (DE); Simon Mayer, Dornstadt (DE)

(73) Assignee: BSH Hausgeräte GmbH, Munich (DE)

( * ) Notice: Subject to any disclaimer, the term of this patent is extended or adjusted under 35 U.S.C. 154(b) by 76 days.

(21) Appl. No.: 18/310,632

(22) Filed: May 2, 2023

(65) Prior Publication Data

US 2023/0349630 A1 Nov. 2, 2023

(30) Foreign Application Priority Data

May 2, 2022 (DE) ..................... 10 2022 204 323.5
May 2, 2022 (DE) ..................... 10 2022 204 324.3
May 2, 2022 (DE) ..................... 10 2022 204 325.1
May 2, 2022 (DE) ..................... 10 2022 204 327.8
May 2, 2022 (DE) ..................... 10 2022 204 328.6

(51) Int. Cl.
*E05F 15/616* (2015.01)
*F25D 23/02* (2006.01)
*F25D 29/00* (2006.01)

(52) U.S. Cl.
CPC .......... *F25D 23/028* (2013.01); *E05F 15/616* (2015.01); *F25D 29/005* (2013.01); *E05Y 2900/31* (2013.01)

(58) Field of Classification Search
CPC ........... E05Y 2900/31; E05Y 2201/426; E05Y 2400/44; E05F 15/619; E05F 15/614; F25D 23/028; F25D 29/005; F25D 2700/02
See application file for complete search history.

(56) References Cited

U.S. PATENT DOCUMENTS 6,338,536 B1 * 1/2002 Ueno .................... F25D 23/028 49/478.1
8,454,102 B2 * 6/2013 Kim ...................... E05F 15/619 312/405

(Continued)

FOREIGN PATENT DOCUMENTS

DE 102014107367 A1 11/2015
EP 2194347 A2 6/2010

*Primary Examiner* — Justin B Rephann

(74) *Attorney, Agent, or Firm* — Laurence A. Greenberg; Werner H. Stemer; Ralph E. Locher

(57) ABSTRACT

A method determines an actuation of a door of a household appliance by a user. The door closes an access opening of a body of the appliance to an interior space by virtue of an elastic seal that is arranged on the door inner side and braces circumferentially against a region of an edge of the access opening. A plunger is moved by a drive unit until a plunger head braces against the door inner side. The plunger is influenced into an opening direction of the door by the drive unit using a bracing force that is smaller than a force for opening the door. An arbitrary stroke of the plunger is detected by a sensor and a sensor signal is allocated to the detected stroke. The sensor signal is compared with a comparison value and the actuation by the user is determined in dependence upon the comparison.

13 Claims, 12 Drawing Sheets

(56) References Cited

U.S. PATENT DOCUMENTS

| | | | | | |
|---|---|---|---|---|---|
| 9,062,911 | B2 * | 6/2015 | Keller | F25D 23/028 | |
| 9,534,829 | B2 * | 1/2017 | Held | F25D 23/028 | |
| 9,695,624 | B2 * | 7/2017 | Heydel | H02K 7/116 | |
| 10,132,555 | B2 * | 11/2018 | Yasaka | F25D 23/028 | |
| 10,174,540 | B2 * | 1/2019 | Heydel | E05F 15/611 | |
| 10,633,893 | B2 * | 4/2020 | Harajli | E05F 15/616 | |
| 10,648,218 | B1 * | 5/2020 | Schroeder | E05F 15/616 | |
| 11,125,005 | B2 * | 9/2021 | Yao | E05F 15/70 | |
| 11,448,000 | B2 * | 9/2022 | Cheng | E05F 1/08 | |
| 11,668,130 | B2 * | 6/2023 | Gunn | E05F 15/665 | 49/31 |
| 2010/0307189 | A1 * | 12/2010 | Keller | F25D 17/047 | 62/449 |
| 2011/0048060 | A1 * | 3/2011 | Kim | E05B 17/0029 | 62/449 |
| 2011/0083461 | A1 * | 4/2011 | Kim | E05F 15/619 | 62/449 |
| 2016/0312513 | A1 * | 10/2016 | Heydel | E05F 15/614 | |
| 2016/0312516 | A1 * | 10/2016 | Heydel | E05F 15/614 | |
| 2017/0097185 | A1 * | 4/2017 | Yasaka | E05F 15/614 | |
| 2017/0336132 | A1 * | 11/2017 | Chang | F25D 23/028 | |
| 2018/0119475 | A1 * | 5/2018 | Kim | E05F 15/614 | |
| 2018/0187470 | A1 * | 7/2018 | Song | F25D 23/087 | |
| 2020/0131835 | A1 * | 4/2020 | Cheng | E05F 15/619 | |
| 2020/0263478 | A1 * | 8/2020 | Yaman | D06F 34/20 | |
| 2024/0151089 | A1 * | 5/2024 | Schroeder | E05F 15/75 | |

* cited by examiner

METHOD FOR DETERMINING AN ACTUATION OF A DOOR OF A HOUSEHOLD APPLIANCE BY A USER, APPARATUS FOR THIS PURPOSE AND ALSO HOUSEHOLD APPLIANCE HAVING THE APPARATUS

CROSS-REFERENCE TO RELATED APPLICATION

This application claims the priority, under 35 U.S.C. § 119, of German Patent Applications:

DE 10 2022 204 323.5, filed May 2, 2022,
DE 10 2022 204 328.6, filed May 2, 2022,
DE 10 2022 204 327.8, filed May 2, 2022,
DE 10 2022 204 324.3, filed May 2, 2022,
DE 10 2022 204 325.1, filed May 2, 2022;

the prior applications are herewith incorporated by reference in their entireties.

FIELD AND BACKGROUND OF THE INVENTION

The invention in accordance with a first aspect relates to a method for determining an actuation of a door of a household appliance by a user. The door closes an access opening of a body of the household appliance to an interior space of the household appliance by virtue of the fact that at least one door inner side of the door braces against an elastic seal that is arranged on the body and circumferentially around the access opening, or an elastic seal that is arranged on the door inner side braces circumferentially against a region of an edge of the access opening. A plunger in the closed state of the door is movably arranged on the body in the direction of a longitudinal axis of the plunger. The longitudinal axis of the plunger is oriented in a transverse manner with respect to the door inner side. The plunger is moved by means of a drive unit until a plunger head of the plunger braces against the door inner side. The invention furthermore relates to an apparatus for determining an actuation of a door of a household appliance by a user. The door closes an access opening of a body of the household appliance to an interior space of the household appliance by virtue of the fact that at least one door inner side of the door braces against an elastic seal that is arranged on the body and circumferentially around the access opening, or an elastic seal that is arranged on the door inner side braces circumferentially against a region of an edge of the access opening. The door having a plunger that in the closed state of the door can be oriented in the direction of a longitudinal axis of the plunger in a transverse manner with respect to the door inner side on the body, and a drive unit, which is coupled to the plunger, for moving the plunger until a plunger head of the plunger braces against the door inner side. Furthermore, the invention also relates to a household appliance having a body that has an interior space and an access opening for the interior space, a door that is pivotably arranged about a pivot axis on the body so as to close the access opening and an apparatus, which is arranged remote from the pivot axis on the body, for determining an actuation of the door of the household appliance by a user. The door closes the access opening of the body of the household appliance to the interior space of the household appliance by virtue of the fact that at least one door inner side of the door braces against an elastic seal that is arranged on the body and circumferentially around the access opening, or an elastic seal that is arranged on the door inner side braces circumferentially against a region of an edge of the access opening.

Methods, apparatuses and also household appliances of the generic type are extensively known in the prior art with the result that printed proof is not required in this respect. In the case of many household appliances, it is meanwhile customary that the opening of the door of the household appliance is performed in an at least in part automated manner in that a door opening mechanism of the household appliance is activated and owing to an opening signal the door opens at least by an angle that can be predetermined with the result that a user can grip behind the door even if the door is configured without a door handle, and can pivot the door into the fully opened position. Furthermore, it is naturally possible that the door opening mechanism also fully opens the door.

In particular in the case of household refrigeration appliances, it is meanwhile customary that the door does not have a door handle or handle for manual actuation by the user. In the case of household appliances of this type, which have a door without a handle, the user performs a, in particular manual, actuation of the door, for example in that they press against the door in an edge region of the door. This actuation can be detected by means of a sensor unit of the household appliance, which then provides a corresponding opening signal for the door opening mechanism. However, in general the sensor unit requires that an actuation region in which an actuation by the user can be reliably identified is comparatively limited. Therefore, the location in which an actuation by the user can be reliably identified can only be provided in a particularly limited manner on an outer side of the door. This sensor region is frequently located approximately centrally in the case of a door that is pivotably arranged about a vertical axis on a body of the household appliance, and namely on an edge of the door that lies opposite the pivot axis. It is in other words necessary, if they wish to open the door, for the user to ensure that their actuation is directed toward this sensor region. For household appliances, this is however already disadvantageous for ergonomic reasons. In particular, if the view is impeded for whatever reason, it is not possible for the user to find the sensor region with the result that the user must test with a plurality of attempts at which location their actuation is detected. It proves particularly disadvantageous if the sensor region cannot be identified in a tactile manner by the user. This relates inter alia to users who have a visual impairment, users who would like to open the household appliance in darkness, and/or the like. In particular, this relates for example to cooling appliances or refrigeration appliances, in particular for household use, in other words household cooling appliances or household refrigeration appliances.

In particular in the case of household cooling appliances or household refrigeration appliances, it is meanwhile known to design the door without a door handle or handle. If a user wishes to access the interior space of the household cooling appliance or household refrigeration appliance, they thus press for example with one hand against the door whereupon the sensor unit detects this manual actuation and actuates the door opening mechanism with which the door is then either fully or at least in part opened. In this context, for example published, non-prosecuted German patent application DE 10 2014 107 367 A1, corresponding to U.S. Pat. No. 9,534,829, discloses a corresponding cooling appliance.

The design in published, non-prosecuted German patent application DE 10 2014 107 367 A1 has however proven at least in part unreliable in the intended operation. The determination of the actuation by the user can only be performed reliably in the region of the sensor unit. In particular, outside the sensor region that is thereby defined, an actuation by the user at best leads by coincidence to the actuation being detected by the sensor unit. For use in the household, this has however proven to be particularly disadvantageous. Moreover, U.S. patent publication 2018/0187470 A1 discloses a cooling appliance.

SUMMARY OF THE INVENTION

The object of the invention is to improve the determination of the actuation of the door of the household appliance by the user, in particular to achieve a more reliable determination.

As a solution, with the invention in accordance with the first aspect, a method, an apparatus and also a household appliance in accordance with the independent claims are proposed.

Advantageous developments are provided by features of the dependent claims.

In relation to a method of the generic type, with the invention it is in particular proposed that the plunger is influenced into an opening direction of the door by the drive unit using a bracing force that is smaller than a force for opening the door. An arbitrary stroke of the plunger is detected by means of a sensor unit and a sensor signal is allocated to the detected stroke, the sensor signal that is allocated to the stroke is compared with at least one comparison value and the actuation by the user is determined in dependence upon the comparison.

In relation to an apparatus of the generic type for determining an actuation of a door of a household appliance by a user, with the invention in particular it is proposed that the drive unit is configured so as to influence the plunger into an opening direction of the door using a bracing force that is smaller than a force for opening the door. The apparatus has a sensor unit that is configured so as to detect an arbitrary stroke of the plunger and so as to allocate a sensor signal to the detected stroke and the apparatus is further configured so as to compare the sensor signal that is allocated to the stroke with at least one comparison value and to determine the actuation by the user in dependence upon the comparison.

In relation to a household appliance of the generic type it is proposed with the invention in particular that the apparatus is configured in accordance with the invention so as to determine an actuation of a door of a household appliance by a user.

The invention is based inter alia on the fact that the door closes an access opening of a body of the household appliance to an interior space of the household appliance by virtue of the fact that at least one door inner side of the door braces against an elastic seal that is arranged on the body and circumferentially around the access opening, or an elastic seal that is arranged on the door inner side braces circumferentially against a region of an edge of the access opening. In the closed state of the door, due to the elastic seal it is achieved that an actuation by the user, for example in the form of an exertion of pressure that can be exerted for example as a manual actuation or the like, can cause a limited small pivoting movement that can be detected and evaluated by means of the apparatus for determining the actuation of the door of the household appliance by the user in order to allocate a sensor signal. This sensor signal can then be supplied to the door opening mechanism in order to cause the door to open. It has now been identified by the inventor that this actuation by the user in general can simultaneously also produce a torsion of the door with the result that an exertion of pressure as an actuation by the user in a region can lead to the fact that the door inner side is arranged closer to the body whereas in another region the door inner side is arranged conversely even further away from the body. Apart from that, this also explains the problem of the prior art that the sensor unit at the sensor region is only selectively capable of reliably identifying the actuation by the user within the sensor region. In the case of an actuation outside the sensor region, it is no longer possible to detect this actuation inter alia on account of the torsional effect.

The invention is based inter alia on this above-mentioned knowledge and proposes therefore that, at least in the closed state of the door, the plunger is influenced into an opening direction of the door by the drive unit using a bracing force. As a consequence, this creates the prerequisite that not only an approach of the door inner side to the body can be detected but rather that almost an arbitrary movement that is made from a resting position in the closed state of the door can be reliably detected. The bracing force is smaller than a force for opening the door, thus in the absence of the actuation by the user and in the absence of the access by the user the door reliably remains in the closed position. It can also be provided that the door opening mechanism only assists the opening of the door by the user, in other words provides a force for opening the door that however in itself in general fails to cause the door to open.

The sensor unit can now detect any stroke of the plunger, namely in particular a forward stroke as well as a return stroke. This means that the function of the sensor unit is independent of the direction in which the stroke of the plunger takes place, so that a corresponding sensor signal can then be allocated to the detected stroke, which can be compared with at least one comparison value. The actuation by the user is determined in dependence upon the comparison, in other words whether the user has performed an actuation on the door. It is thus determined whether an actuation by the user, in particular a manual actuation, has occurred. This makes the invention especially particularly suitable for use with doors without handles or door handles.

In this context, "door open" means that the door is no longer closed.

The plunger, in particular the plunger head, does not need to be permanently mechanically fixedly connected to the door inner side or the door. As soon as the user closes the door, the plunger can, for example, be moved by means of the closing movement back into a starting position in which the door inner side comes into contact with the plunger head and moves the plunger head along until the fully closed state of the door. However, it can also be provided that after causing the door to open, the drive unit actively moves the plunger into a retracted position, and the plunger is only influenced using the bracing force by the drive unit after the door is closed. It is thereby possible for the plunger head to be moved back towards the door inner side until it rests against the door inner side.

The plunger can have at least a round or an angular cross-sectional shape. It is preferred that, the plunger is circular or rectangular in cross section. The cross-sectional shape of the plunger is preferably substantially constant over its axial extent. In the region of the first end, however, this can also be provided in a deviating manner. The plunger head can have the same cross-sectional shape as the plunger. However, the plunger head can also have a curved spherical shape. In terms of a cross-sectional area, the plunger head can be smaller or also larger than a cross-sectional area of the plunger in the longitudinal extent.

Thus, unlike in the prior art, in the case of the invention it is not a pressure that is detected using the sensor unit, but rather actually the stroke that is performed by the plunger is detected. This can take place, for example, by means of a displacement sensor or the like.

The comparison value can, for example, be ascertained empirically and include a change in stroke within a predetermined period of time or the like. In dependence upon the comparison, the actuation by the user can then be determined. For this purpose, the apparatus can have a control facility, which can be configured, for example, as an electronic control facility and which can be coupled to the sensor unit in terms of communication or signaling in order to receive the sensor signal from the sensor unit. The control facility can, for example, be configured as an electronic hardware circuit. It can have a program-controlled computer unit in order to be able to realize the desired functionality. The control facility can also be formed entirely by the computer unit. A combination of a hardware circuit with the computer unit is also feasible. Furthermore, it can also be provided that the control facility exclusively comprises a hardware circuit. The control facility can also be at least partially included in a superordinate control facility of the household appliance. However, the control facility can also be provided as a separate component in the household appliance. It is preferred that the control facility is at least partially part of the apparatus for determining the actuation of the door of the household appliance by the user.

The apparatus can have a housing, for example an apparatus housing or the like, in which the elements or units of the apparatus are at least partially arranged. Thus, it can be provided that the plunger is at least partially movably arranged in the housing. It is thereby possible, by positioning the apparatus on the body of the household appliance, to also be able to orient the plunger in relation to its position relative to the door inner side in the closed state of the door. The apparatus can further have, in the housing, the drive unit that is coupled to the plunger so as to move the plunger. For this purpose, it can be provided that the drive unit has an electric machine, in particular a rotating or rotatable electric machine, which has a rotor that is arranged rotatably relative to a stator that is arranged in a rotationally fixed manner. The rotor is preferably connected to the plunger via a gearing mechanism so that the desired drive functionality can be achieved.

The electric machine is in general configured as a rotating or rotatable electric machine and is likewise extensively known in the prior art, so that as in the case of the household appliance, separate printed proof is not required in this respect. A rotating electric machine is an apparatus which converts electrical energy into mechanical energy, in particular into rotational energy, in a motor operation and/or mechanical energy into electrical energy in a generator operation. The movement is in general a rotational movement that is performed by a rotor of the rotating electric machine, the rotor being arranged rotatably relative to a stator of the rotating electric machine. In contrast to the rotor, the stator is in general arranged in a rotationally fixed manner, in other words a rotational movement is a rotational movement of the rotor relative to the stator. The rotor is arranged rotatably mounted relative to the stator, wherein an air gap is in general formed between the rotor and the stator.

In the intended operation, the stator and the rotor are linked by means of a magnetic flux, whereby in the motor operation the force effect or the torque is provided which drives the rotor in rotation relative to the stator. In the generator operation, mechanical energy that is supplied to the rotor in the form of a rotation in conjunction with a torque is converted into electrical energy. For this purpose, at least the stator has an electric winding through which an electric current flows, also called stator winding. The rotor can likewise have an electric winding as a rotor winding and/or one or more permanent magnets.

For the intended operation, the electrical voltage is applied to the stator winding. Depending upon the construction of the electric machine, in particular its stator winding, a single-phase or also a multi-phase stator winding can be provided, for example, for the application of an alternating voltage, and a single-phase or multi-phase electrical alternating voltage is accordingly applied to said stator winding. A multi-phase alternating voltage in general has phase alternating voltages corresponding to the number of phases and said phase alternating voltages in general have approximately the same frequency and approximately the same amplitude, but are shifted with respect to one another in terms of their phase position. A very common multi-phase alternating voltage is, for example, a three-phase alternating voltage in which the phase voltages are shifted in phase by 120° with respect to one another. Such an alternating voltage is also used, for example, in the public power supply network.

The sensor signal is preferably an electrical signal, which can be, for example, an analogue or a digital, in particular binary, signal.

The invention makes it possible to reliably detect the actuation of a door of a household appliance and thus to detect the actuation by the user even if interfering influences such as the torsion of the door, an elasticity of the door and/or the like make the detection difficult. It is simultaneously possible to achieve that the actuation by the user can be reliably detected and determined at almost any location on the door.

It is further proposed that during a forward stroke of the plunger, the sensor signal that is allocated to the movement is compared with a forward stroke comparison value. The forward stroke comparison value is thus used as a comparison value in the present case. In this manner, a specific comparison value can be provided for the forward stroke, so that, if a forward stroke is present, the determination in relation to the actuation of the door of the household appliance by the user can be improved. In particular, the forward stroke relates to an axial mechanical movement of the plunger in which the plunger head of the plunger is moved away from the body, in other words is moved out of the body.

Furthermore, it is proposed that during a return stroke of the plunger, the sensor signal that is allocated to the movement is compared with a return stroke comparison value. The return stroke comparison value is thus likewise used as a comparison value in the present case. This can also further improve the reliability of the determination of the actuation of the door of the household appliance by the user. The return stroke is opposite in direction to the forward stroke. The return stroke comparison value can have the same value as the forward stroke comparison value.

According to an advantageous development, it is proposed that the forward stroke comparison value and the return stroke comparison value are different comparison values from one another. As a consequence, it is possible to take into account different properties of the door when it is actuated by the user, in particular disrupting properties such as torsion of the door can be better taken into account. Thus, the reliability of the determination of the actuation by the user can be further improved.

Furthermore, it is proposed that the bracing force is provided by the drive unit without a supply of energy. This has the advantage that the bracing force can be reliably provided without requiring energy, in particular electrical energy, even during a long period between a closing operation of the door, in which the door is pivoted into the closed state, and a subsequent operation of opening the door, in which the door is pivoted into the open state. The drive unit can be configured accordingly in this respect and can have, for example, one or more corresponding spring mechanism elements or the like which are capable of providing the bracing force even without an external supply of energy.

Furthermore, it is proposed that the drive unit has an electric machine having a rotor, which is arranged rotatably relative to the stator, and a gearing mechanism that is mechanically connected to the rotor and the plunger, wherein the bracing force is provided by means of the gearing mechanism. This has the advantage that the provision of the bracing force can be rendered possible by the gearing mechanism alone without a supply of energy. For this purpose, the gearing mechanism can have one or more corresponding energy storage elements that are capable of providing the bracing force in the absence of the operating functionality of the electric machine. As a consequence, the reliability of the function of determining the actuation by the user can be further improved.

Furthermore, it is proposed that the plunger is moved by means of the drive unit in the opened state of the door into a position in which the forward stroke is greater than the forward stroke in the closed state of the door. This forward stroke is thus greater than the forward stroke that can be detected by means of the sensor unit in the closed state of the door, preferably independently of the actuation by the user. The possibility for additional functionalities is thereby created, such as for example detecting the opened state of the door. Corresponding sensor signals can be allocated and provided to a superordinate control facility of the household appliance.

Furthermore, it is proposed that the plunger is moved axially as the door is being closed and the movement of the plunger is detected as a closing movement. This movement is likewise a return stroke. In particular, if previously in the opened state the forward stroke is greater than the forward stroke in the closed state of the door, it is consequently possible to detect that the user is closing the door. As a consequence, it is possible to provide a closing signal as a sensor signal, which can be made available to the superordinate control facility of the household appliance. It is thereby possible to reliably realize further functionalities.

It is further proposed that immediately after the door is closed by the user, the plunger is moved by means of the drive unit until the plunger head of the plunger is braced against the door inner side. It is preferred that, the bracing force is then also applied in this state. An initial position can thereby be achieved, which can be used as a starting point for performing the method according to the invention. It is also advantageous inter alia if, after the door has been opened, the plunger performs a return stroke into a fully retracted position by means of the drive unit, so that the plunger, in particular the plunger head, is moved, for example, in a recessed position in which it does not protrude beyond the body.

In relation to the apparatus, it is further proposed that the drive unit has an electric machine having a rotor, which is arranged rotatably relative to a stator, and a gearing mechanism that is mechanically connected to the rotor and the plunger.

The door is preferably arranged on the body in a first region of an edge of the access opening so as to be pivotable about an at least vertical or horizontal axis. In this respect, the invention renders it possible for the actuation of the door of the household appliance by the user to be determined even if this actuation takes place in the vicinity of the pivot axis. The invention thus makes it possible to achieve a considerably enlarged sensor region overall, so that the disadvantages that are mentioned at the beginning in relation to the prior art can be avoided to a great extent.

In accordance with a second aspect, the invention relates to a door opening apparatus for causing a door of a household appliance to open, having a plunger which is arranged movably in the direction of a longitudinal axis of the plunger. The longitudinal axis of the plunger can be oriented in a transverse manner with respect to a door inner side in the closed state of the door. On the door side the plunger has a first plunger end with a plunger head, a rotating electric machine that has a rotor that is arranged rotatably relative to a stator, a gearing mechanism that is mechanically coupled to the rotor and the plunger for mechanically coupling, in terms of drive, the rotor to the plunger, and a control unit that is electrically coupled to a stator winding of the stator and is configured so as to apply an electrical voltage to the stator winding so as to assist the opening of the door at least during a temporary bracing abutment of the plunger head against the door inner side. Furthermore, the invention relates to a household appliance having a body that has an interior space and an access opening for the interior space, and a door for closing the access opening. The door is pivotably arranged on the body about an at least partially vertical or horizontal axis in a first region of an edge of the access opening. A door opening apparatus is arranged on the body outside the first region for causing the door to open. Finally, the invention also relates to a method for causing a door of a household appliance to open by means of a plunger that is arranged movably in the direction of a longitudinal axis. The longitudinal axis of the plunger is oriented in a transverse manner with respect to a door inner side in the closed state of the door, and on the door side the plunger has a first plunger end with a plunger head. The plunger is driven by means of a rotating electric machine, which has a rotor that is arranged rotatably relative to a stator, for which purpose the rotor and the plunger are mechanically coupled in terms of drive by means of a gearing mechanism. A stator winding of the stator, which is electrically coupled to a control unit, is influenced using an electrical voltage in order to cause the door to open at least during a temporary bracing abutment of the plunger head against the door inner side.

Methods, apparatuses and also household appliances of the generic type are extensively known in the prior art with the result that printed proof is not required in this respect. In the case of many household appliances, it is meanwhile customary that the opening of the door of the household appliance is performed in an at least in part automated manner in that a door opening mechanism of the household appliance is activated and owing to an opening signal the door opens at least by an angle that can be predetermined with the result that a user can grip behind the door even if the door is configured without a door handle, and can pivot the door into the fully opened position. Furthermore, it is naturally possible that the door opening mechanism also fully opens the door.

In particular in the case of household refrigeration appliances, it is meanwhile customary that the door does not have a door handle or handle for manual actuation by the user. In the case of household appliances of this type, which have a door without a handle, the user performs a, in particular manual, actuation of the door, for example in that they press against the door in an edge region of the door. This actuation can be detected by means of a sensor unit of the household appliance, which then provides a corresponding opening signal for the door opening mechanism. However, in general the sensor unit requires that an actuation region in which an actuation by the user can be reliably identified is comparatively limited. Therefore, the location in which an actuation by the user can be reliably identified can only be provided in a particularly limited manner on an outer side of the door. This sensor region is frequently located approximately centrally in the case of a door that is pivotably arranged about a vertical axis on a body of the household appliance, and namely on an edge of the door that lies opposite the pivot axis. It is in other words necessary, if they wish to open the door, for the user to ensure that their actuation is directed toward this sensor region. For household appliances, this is however already disadvantageous for ergonomic reasons. In particular, if the view is impeded for whatever reason, it is not possible for the user to find the sensor region with the result that the user must test with a plurality of attempts at which location their actuation is detected. It proves particularly disadvantageous if the sensor region cannot be identified in a tactile manner by the user. This relates inter alia to users who have a visual impairment, users who would like to open the household appliance in darkness, and/or the like. In particular, this relates for example to cooling appliances or refrigeration appliances, in particular for household use, in other words household cooling appliances or household refrigeration appliances.

In particular in the case of household cooling appliances or household refrigeration appliances, it is meanwhile known to design the door without a door handle or handle. If a user wishes to access the interior space of the household cooling appliance or household refrigeration appliance, they thus press for example with one hand against the door whereupon the sensor unit detects this manual actuation and provides a sensor signal by means of which the door opening mechanism is actuated and the door is then either fully or at least in part opened using the door opening mechanism. In this context, for example published, non-prosecuted German patent application DE 10 2014 107 367 A1 discloses a corresponding cooling appliance. Moreover, U.S. patent publication 2018/0187470 A1 discloses a cooling appliance.

Even if the prior art has proven itself, disadvantages nevertheless remain. In particular, the design in published, non-prosecuted German patent application DE 10 2014 107 367 A1 is comparatively complex in terms of functionality and requires a lot of space. As a result, the opening mechanism in DE 10 2014 107 367 A1 can only be arranged at a few selected locations on the body of the household appliance. The use of a piezo sensor proves to have limited reliability. Furthermore, it proves troublesome that the door opening mechanisms in both DE 10 2014 107 367 A2 and U.S. 2018/0187470 A1 result in a not inconsiderable energy consumption in the absence of the opening.

The object of the invention is to provide an improved door opening apparatus which renders it possible to reduce the energy consumption and/or the outlay, in particular in the absence of the opening of the door.

As a solution, with the invention in accordance with the second aspect, a door opening apparatus, a household appliance and also a method in accordance with the independent claims are proposed.

Advantageous developments are provided by features of the dependent claims.

In relation to a door opening apparatus according to the generic type, with the invention it is in particular proposed that the door opening apparatus has a mechanical bracing unit that is configured so as to influence the plunger using a force so as to mechanically brace the plunger head against the door inner side at least in the closed state of the door and at least in the absence of the application of the electrical voltage to the stator winding, and a circuit arrangement that is electrically coupled to the stator winding for detecting an induced voltage of the stator winding in the absence of the application of the electrical voltage to the stator winding.

In relation to a household appliance according to the generic type, the invention in particular proposes that the door opening apparatus is configured in accordance with the invention.

In relation to a method according to the generic type, with the invention it is in particular proposed that the plunger is influenced using a force by means of a mechanical bracing unit so as to mechanically brace the plunger head against the door inner side at least in the closed state of the door and at least in the absence of the application of the electrical voltage to the stator winding, and by means of a circuit arrangement that is electrically coupled to the stator winding an induced voltage of the stator winding is detected in the absence of the application of the electrical voltage to the stator winding.

The invention is based inter alia on the fact that the door closes an access opening of a body of the household appliance to an interior space of the household appliance by virtue of the fact that at least one door inner side of the door braces against an elastic seal that is arranged on the body and circumferentially around the access opening, or an elastic seal that is arranged on the door inner side braces circumferentially against a region of an edge of the access opening. In the closed state of the door, due to the elastic seal it is achieved that an actuation by the user, for example in the form of an exertion of pressure that can be exerted for example as a manual actuation or the like, can cause a limited pivoting movement that can be detected and evaluated by means of the door opening apparatus of the household appliance by the user in order to allocate a sensor signal. This sensor signal can then be supplied to the control facility of the door opening apparatus in order to cause the door to open. It can also be provided that the door opening apparatus only assists the opening of the door by the user, in other words provides a force for opening the door that however in itself in general fails to cause the door to open.

The plunger, in particular the plunger head, does not need to be permanently mechanically fixedly connected to the door inner side or the door. The bracing abutment can, for example, be automatically released when the door is opened by a predetermined pivot angle or a pivot angle that can be predetermined relative to the closed state. As soon as the user closes the door, the plunger can, for example, be moved by means of the closing movement back into a starting position in that the door inner side presses against the plunger head and moves this plunger head along until the fully closed state of the door. However, it can also be provided that after causing the door to open, the drive unit actively moves the plunger into a retracted position, and the plunger is only influenced using the bracing force by the door opening apparatus after the door is closed. It is thereby possible for the plunger head to be moved back towards the door inner side until it rests against the door inner side.

Thus, unlike in the prior art, in the case of the invention it is not a pressure that is detected, but rather actually the stroke that is performed by the plunger is detected. This can take place, for example, by means of a displacement sensor or the like.

The invention is based, inter alia, on the idea that the plunger head can already rest against the door inner side in the closed state of the door. The door opening apparatus can thus not only be used to cause the door of the household appliance to open, but rather it is also possible to simultaneously use the door opening apparatus as a sensor for an opening state of the door, a manual actuation by a user and/or the like, so that, inter alia, a door opening request of the user can also be detected. Compared to the prior art, it is thereby no longer necessary to provide a separate sensor unit for this purpose. This can be omitted entirely because the door opening apparatus itself also simultaneously provides the sensor functionality.

The invention achieves this, inter alia, by the fact that in the closed state of the door the plunger or its plunger head is braced against, or rests against, or touches the door inner side. It is thereby possible that the plunger does not need to perform a stroke until making contact with the door inner side. Therefore, inter alia, an actuation by the user, which can be manifested at least in a slight movement of the door, can also be detected by means of the plunger, wherein the door opening apparatus can detect the movement of the plunger that is consequently caused. The detection operation in this case is preferably coupled to a situation in which the electrical voltage is not applied to the stator winding by the control unit. It is thereby in addition possible to use the stator winding to detect a stroke of the plunger in that an induced voltage is detected. The induced voltage can be accordingly evaluated. This explains why the mechanical bracing unit influences the plunger using a force so that the plunger head is mechanically braced against the door inner side. Unlike in the prior art, it is therefore preferably provided in the case of the invention that during the closed state of the door a continuous mechanical contact occurs between the plunger head and the door inner side.

In this context, “door open” means that the door is no longer closed.

The electric machine can, for example, be configured as a single-phase or multi-phase AC machine, a stepper motor or also a DC machine. To cause the door to open, the electrical voltage is applied by the control unit to the stator winding of the electric machine or the stator of the electric machine. This produces a motor effect which is converted via the gearing mechanism into a translational force on the plunger, so that the plunger can be influenced using a force in the direction of the door inner side and which is suitable for causing the door to open. Since only a temporary bracing abutment of the plunger head against the door inner side is provided, it is then possible for the plunger to be moved only a small stroke in order to push the door open, so that the user can grip behind an edge of the door and thereby fully open the door. In this regard, the gearing mechanism is preferably configured in such a manner that it can not only convert a rotational movement of the rotor into a translational movement of the plunger, but rather is also capable of converting a translational movement of the plunger into a rotational movement of the rotor.

The plunger, in particular the plunger head, thus does not need to be permanently mechanically fixedly connected to the door inner side or the door. As soon as the user closes the door, the plunger can, for example, be moved by means of the closing movement back into a starting position in that the door inner side presses against the plunger head and moves this plunger head along until the fully closed state. However, it can also be provided that after causing the door to open by applying a further, different electrical voltage to the stator winding, the plunger is actively moved into a retracted position and only after closing the door is the force applied again by means of the mechanical bracing unit, so that the plunger head is moved towards the door inner side until the plunger head rests against the door inner side.

The plunger can have at least a round or an angular cross-sectional shape. It is preferred that the plunger is configured as circular or rectangular. The cross-sectional shape of the plunger is preferably substantially constant over its axial extent. In the region of the first end, however, this can also be provided in a deviating manner. The plunger head can have the same cross-sectional shape as the plunger. However, the plunger head can also have a curved spherical shape. In terms of a cross-sectional area, the plunger head can be smaller or also larger than a cross-sectional area of the plunger in the longitudinal extent.

The electric machine is in general configured as a rotating or rotatable electric machine and is likewise extensively known in the prior art, so that as in the case of the household appliance, separate printed proof is not required in this respect. A rotating electric machine is an apparatus which converts electrical energy into mechanical energy, in particular into rotational energy, in a motor operation and/or mechanical energy into electrical energy in a generator operation. The movement is in general a rotational movement that is performed by a rotor of the rotating electric machine, the rotor being arranged rotatably relative to a stator of the rotating electric machine. In contrast to the rotor, the stator is in general arranged in a rotationally fixed manner, in other words a rotational movement is a rotational movement of the rotor relative to the stator. The rotor is arranged rotatably mounted relative to the stator, wherein an air gap is in general formed between the rotor and the stator.

In the intended operation, the stator and the rotor are linked by means of a magnetic flux, whereby in the motor operation the force effect or the torque is provided which drives the rotor in rotation relative to the stator. In the generator operation, mechanical energy that is supplied to the rotor in the form of a rotation in conjunction with a torque is converted into electrical energy. For this purpose, at least the stator has an electric winding through which an electric current flows, also called stator winding. The rotor can likewise have an electric winding as a rotor winding and/or one or more permanent magnets.

For the intended operation, the electrical voltage is applied to the stator winding in order to open the door. Depending upon the construction of the electric machine, in particular its stator winding, a single-phase or also a multi-phase stator winding can be provided, for example, for the application of an alternating voltage, and a single-phase or multi-phase electrical alternating voltage is accordingly applied to said stator winding. A multi-phase alternating voltage in general has phase alternating voltages corresponding to the number of phases and said phase alternating voltages in general have approximately the same frequency and approximately the same amplitude, but are shifted with respect to one another in terms of their phase position. A very common multi-phase alternating voltage is, for example, a three-phase alternating voltage in which the phase voltages are each shifted in phase by 120° with respect to one another. Such an alternating voltage is also used, for example, in the public power supply network.

The control unit is preferably configured as an electronic hardware circuit and can have a program-controlled computer unit in order to realize the desired functionality. In particular, the control unit, in particular the hardware circuit, can have a DC/DC converter, an inverter and/or the like for applying the electrical voltage to the stator winding. Naturally, the control unit can also be formed only by the computer unit or also have a combination of a hardware circuit with the computer unit. For this reason however, it is also possible for the control unit to comprise only a hardware circuit. The control unit can also be at least partially included in a superordinate control unit of the household appliance. However, the control unit can also be provided as a separate component in the household appliance. In particular, the control unit is provided at least partially as part of the door opening apparatus.

To provide the sensor functionality, the door opening apparatus, for example the control unit, provides the circuit arrangement that is electrically coupled to the stator winding. It is thereby possible to achieve that by means of the circuit arrangement the induced voltage of the stator winding can be detected in the absence of the application of the electrical voltage to the stator winding by the control unit. The detected electrical voltage can then be at least partially evaluated by at least the circuit arrangement or the control unit. It is possible due to the evaluation to ascertain for example, whether there is an actuation by a user, the door is closed, and/or the like. The control unit can be configured so as to electrically couple the stator winding only to the circuit arrangement in the absence of the application of the electrical voltage. A suitably configured switching unit can be provided for this purpose. However, it can also be provided that the circuit arrangement is permanently electrically coupled to the stator winding and that switching elements of the inverter are switched into a switched-off switching state in the absence of the application of the electrical voltage to the stator winding. This can also enable the induced voltage to be detected by the circuit arrangement. If required, it can be provided that the electrical coupling has a galvanic isolation unit in order to be able to realize an electrical potential isolation between the stator winding and the circuit arrangement.

In accordance with one development, it is proposed that the bracing unit has a magnet for interacting with a magnetizable bracing region of the door inner side, wherein the magnet is arranged on the plunger head. It is thereby possible for the bracing unit to be realized in a particularly simple manner, because the plunger head can be braced against the door inner side due to the magnetic interaction, in particular in the closed state of the door. Furthermore, the temporary bracing abutment of the plunger head against the door inner side can also be achieved particularly easily in this way, because as the door is being opened by the user, the connection between the magnet or the plunger head and the magnetizable bracing region of the door can be released in a simple manner by applying an appropriate force. This allows the door to be swung wide open by the user without obstructing the access of the user through the access opening. As soon as the door is closed again by the user, the connection can be re-established in that the magnetizable bracing region is produced using the plunger head or its magnets via magnetic interaction, so that a bracing of the plunger head can be reliably achieved at least during the closed state of the door. This bracing unit furthermore has the advantage that it can be operated in a particularly reliable and continuous manner and can be particularly insensitive with respect to disruptive influences such as dirt, moisture and/or the like.

In accordance with one development, it is proposed that the bracing unit has a spring element for influencing the plunger using a force. The force that is applied by means of the spring element is preferably directed in the direction of the door inner side in the closed state of the door, so that the plunger head can be braced against the inner side of the door. The spring element can be configured, for example, as a disc spring, a leaf spring or a helical spring. As a helical spring, it is preferably configured in such a manner that it at least partially surrounds the plunger in the radial direction and is braced against a radial projection or collar of the plunger. On the opposite side, the spring element can be braced against the housing.

In accordance with one development, it is proposed that the door opening apparatus has a stop for limiting a maximum extended position of the plunger head. The stop can be provided for example on the housing side or also on the sleeve side. The stop can interact with a projection or a recess of the plunger. By limiting the maximum extended position of the plunger, it can be achieved that the plunger in the maximum extended position in an open state of the door impedes the user as little as possible in accessing the interior of the body. In particular, it is consequently possible to improve the ergonomics and safety.

In accordance with one advantageous development, it is proposed that the door opening apparatus has a position sensor for detecting a position of the plunger head. As a consequence, it is possible to achieve that for example at least the opened state or also the closed state of the door can be detected. There is then the possibility in certain circumstances in dependence upon the detected position to output a corresponding message. The position sensor can be configured so as to detect at least a single position of the plunger. This can be for example the closed state of the door. Furthermore, it is possible by means of the position sensor to also detect the opened state of the door. It can also be provided that more than only a single position of the plunger head is detected by means of the position sensor. In particular, naturally the positions of the plunger can be detected in the closed and in the opened state of the door.

It is further proposed that the circuit arrangement has at least two measuring connectors that are connected to the stator winding. It is possible by means of the measuring connectors to achieve the electrical connection of the circuit arrangement to the stator winding. For this reason, the connector can be configured as detachable. It is however preferred to provide a non-detachable connection. The connection can be achieved by virtue of the fact that the measuring connectors are directly connected for example to the control unit, in particular to the inverter of the control unit. It can however also be provided that the measuring connectors are connected via the switching unit to the stator winding with the result that an electrical coupling can be achieved in dependence upon a switching state of the switching unit. The invention is however not limited to the use of two measuring connectors. In the case of a multi-phase stator winding, it is possible for example that the induced voltage is detected at more than one single phase winding, preferably at all the phase windings. In this regard, it is possible to provide a corresponding number of measuring connectors.

Furthermore, it is proposed that the circuit arrangement has a voltage limiting unit for limiting the electrical voltage between the at least two measuring connectors. This proves in particular advantageous if the circuit arrangement is permanently electrically coupled to the stator winding. The circuit arrangement can thereby be protected against excess voltage stress such as can occur for example as the door is being opened.

Furthermore, it is proposed that the circuit arrangement has an amplifier unit for amplifying the electrical voltage between the at least two measuring connectors. The amplifier unit can be realized as an electronic circuit. For example, the amplifier unit can have at least one or more operation amplifiers or one or more transistors. The amplifier unit can provide an adjustable or fixed amplification factor. The amplification factor can be adjusted, preferably in an automated manner, for example in the intended operation of the door opening apparatus.

In accordance with one development, it is proposed that the amplifier unit has a control connection for activating the amplification. The control connection can be electrically connected to the control unit with the result that the control unit can activate the amplification as required. It is thereby possible to save energy because the amplifier unit only needs to be activated if this is required. Furthermore, it can be provided that the amplification is only performed, in particular repeated, at points in time that can be predetermined.

It is further proposed that the control unit influences the control connection using an activation signal at least temporarily in the absence of the application of the electrical voltage to the stator winding. It is thereby achieved that the amplification is only performed in the absence of the application of the electrical voltage to the stator winding.

In accordance with one development, it is proposed that the amplifier unit has a differential amplifier and the input connectors of the differential amplifier are electrically coupled to the at least two measuring connectors. It is thereby possible to achieve a simple and cost-effective realization of the amplifier unit.

It is furthermore proposed that the stator winding is configured for an operation at a multi-phase alternating voltage as an electrical voltage in that the stator winding has at least one respective phase winding for each of the phases of the alternating voltage and the at least two measuring connectors are connected to precisely one of the phase windings or to two different phase windings. The phase windings can be interconnected in a star connection or n-corner connection in the case of three phase windings in a delta connection. It is thereby possible to achieve a reliable detection of the induced voltage with little outlay.

Furthermore, it is proposed that the circuit arrangement has a filter unit for filtering a voltage that is induced between the at least two measuring connectors. With the filter unit it is possible to achieve that interference signals can be filtered out at the at least two measuring connectors. This renders it possible to improve the detection of the induced voltage and the reliability of the sensor functionality.

In accordance with one development, it is proposed that the circuit arrangement has a comparison unit for comparing the detected induced voltage with a voltage comparison value. The circuit arrangement is consequently configured so as in the absence of the application of the electrical voltage to the stator winding to detect an electrical voltage that is induced in the stator winding, to compare it with a comparison value that can be predetermined and so as to determine in dependence upon the comparison for example a manual actuation to open the door by the user. It is possible due to the selection of the comparison value to adjust the sensor functionality. Furthermore, it is also possible to improve the reliability at least in relation to the detection of the induced voltage. For this purpose, the circuit arrangement can have a comparison unit that can have for example a comparator, a window comparator or the like. With the window comparator, it is possible to achieve that the induced voltage is only supplied for the further evaluation if it is in a range that can be predetermined. In this manner, it is possible for example to identify, in an automated manner, the evaluation while the electrical voltage is applied.

In accordance with one development, it is proposed that the door opening apparatus is configured in the closed state of the door so as to be at least temporarily operated in a passive state and to switch into an active state in dependence upon the comparison. Due to the active state and the passive state, it is possible to operate the door opening apparatus in an energy saving mode in which energy consumption is reduced. The energy saving mode can be allocated to the passive state. In particular, it is proposed that the control unit is configured so as to only apply the electrical voltage to the stator winding in the active state. It is consequently only possible to cause an opening of the door in the active state. In the passive state, the control unit can be at least in part deactivated with the result that for example the electrical voltage cannot be applied to the stator winding. The inverter can thus be fully deactivated using an associated control unit. It is therefore not possible to cause an opening of the door in the passive state. This can also improve the reliability because the risk of opening the door on account of an interference signal can be reduced.

It is preferably proposed that the circuit arrangement is configured so as to only detect the induced voltage in the passive state. It is thus possible to only provide the detection of the induced voltage in the passive state. Also, as a consequence the reliability can be improved and the energy consumption can be reduced. In the active state, it is possible for example to fully deactivate the circuit arrangement. The circuit arrangement only needs to be supplied with electrical energy in the passive state.

In relation to the household appliance, it is further proposed that a door inner side of the door in a door region, which lies opposite the door opening apparatus in the closed state of the door, has at least in part a magnetizable material as a magnetizable bracing region. The magnetizable material can feature for example iron, cobalt, nickel or the like. Naturally, alloys of these that have ferromagnetic properties can also be provided. The magnetizable material can form the entire door inner side. It is however also possible to provide that the magnetizable material is only provided in the magnetizable bracing region. In this manner, it is possible to achieve a simple use with a door opening apparatus and the bracing unit of the door opening apparatus has a magnet.

It is further proposed that the magnetizable material is formed at least in part by a ferromagnetic plate that can be at least in part adjusted with regard to its position and orientation. The ferromagnetic plate can be arranged as a separate component as a magnetizable bracing region on the door inner side. For example, the ferromagnetic plate can be connected by means of screws, adhesives, clamps or the like to the door inner side. It is preferred that the ferromagnetic plate however can be at least in part adjusted with the result that for example a position with respect to a surface of the door inner side can be changed in that the ferromagnetic plate can be adjusted for example with regard to a protrusion with respect to the door inner side or the like. It can also be provided that the ferromagnetic plate can be pivoted or twisted with respect to a surface of the door inner side. As a consequence, the function of the invention can be further improved.

In relation to the household appliance, it is further proposed that the axis is a vertical axis and the first region is a vertical edge of the access opening, wherein the door opening apparatus is arranged at least above or below the access opening on the body. As a consequence, it is possible to achieve a reliable construction of the household appliance that can continuously ensure a reliable function of the door opening apparatus. Altogether, the function of the household appliance can thereby be further improved.

In accordance with a third aspect, the invention relates to a method for operating a door opening apparatus that is used to open a door of a household appliance by means of a plunger that is movably arranged in the direction of a longitudinal axis, wherein in a closed state of the door the longitudinal axis of the plunger is oriented in a transverse manner with respect to a door inner side and on the door side the plunger has a first plunger end with a plunger head. The plunger can be influenced using an opening force, which is to be applied so as to open the door, so as in an active state of the door opening apparatus to cause the door to open by a drive unit of the door opening apparatus at least during a temporary bracing abutment of the plunger head against the door inner side. Furthermore, the invention relates to a door opening apparatus for opening a door of a household appliance, having a plunger that can be movably arranged in the direction of a longitudinal axis with the result that in a closed state of the door the longitudinal axis of the plunger is oriented in a transverse manner with respect to a door inner side, wherein on the door side the plunger has a first plunger end with a plunger head, and having a drive unit for causing the door to open. The door opening apparatus is configured so as to influence the plunger using an opening force, which is to be applied so as to open the door, in an active state of the door opening apparatus at least during a temporary bracing abutment of the plunger head against the door inner side. Finally, the invention also relates to a household appliance having a body that has an interior space and an access opening for the interior space, a door for closing the access opening, wherein the door is pivotably arranged on the body about an at least partially vertical or horizontal axis in a first region of an edge of the access opening, and a door opening apparatus that is arranged on the body outside the first region for causing the door to open.

Methods, door opening apparatuses and also household appliances of the generic type are extensively known in the prior art with the result that printed proof is not required in this respect. In the case of many household appliances, it is meanwhile customary that the opening of the door of the household appliance is performed in an at least in part automated manner in that a door opening mechanism of the household appliance is activated and owing to an opening signal the door opens at least by an angle that is predetermined or can be predetermined with the result that a user can grip behind the door even if the door is configured without a door handle, and can pivot the door into the fully opened position. Furthermore, it is naturally possible that the door opening mechanism also fully opens the door.

In particular in the case of household refrigeration appliances, it is meanwhile customary that the door does not have a door handle or handle for manual actuation by the user. In the case of household refrigeration appliances of this type, which have a door without a handle, the user performs an, in particular manual, actuation of the door, for example in that they press against the door in an edge region of the door. This actuation can be detected by means of a sensor unit of the household refrigeration appliance, which then provides a corresponding opening signal for the door opening mechanism.

However, in general the sensor unit requires that an actuation region in which an actuation by the user can be reliably identified is comparatively limited. Therefore, the location in which an actuation by the user can be reliably identified can only be provided in a particularly limited manner on an outer side of the door. This sensor region is frequently located approximately centrally in the case of a door that is pivotably arranged about a vertical axis on a body of the household appliance, and namely on an edge of the door that lies opposite the pivot axis. In particular, this relates for example to cooling appliances or refrigeration appliances, in particular for household use, in other words household cooling appliances or household refrigeration appliances.

In particular in the case of household cooling appliances or household refrigeration appliances, it is meanwhile known to design the door without a door handle or handle. If a user wishes to access the interior space of the household cooling appliance or household refrigeration appliance, they thus press for example with one hand against the door whereupon the sensor unit detects this manual actuation and provides a sensor signal by means of which the door opening mechanism is actuated, and the door is then either fully or at least in part opened using the door opening mechanism. In this context, for example, published, non-prosecuted German patent application DE 10 2014 107 367 A1 discloses a corresponding cooling appliance. Moreover, U.S. patent publication 2018/0187470 A1 discloses a cooling appliance.

Even if the prior art has proven itself, disadvantages nevertheless remain. In particular, the design in DE 10 2014 107 367 A1 is comparatively complex in terms of functionality and requires a lot of space. As a result, the opening mechanism in DE 10 2014 107 367 A1 can only be arranged at a few selected locations on the body of the household appliance. The use of a piezo sensor proves to have limited reliability. Furthermore, it proves troublesome that the door opening mechanisms in DE 10 2014 107 367 A2 and US 2018/0187470 A1 result in a not inconsiderable energy consumption in the absence of the opening.

The object of the invention is to provide an improved door opening apparatus which renders it possible to reduce the energy consumption and/or the outlay, in particular in the absence of the opening of the door.

As a solution, with the invention in accordance with the third aspect, a door opening apparatus, a household appliance and also a method in accordance with the independent claims are proposed.

Advantageous developments are provided by features of the dependent claims.

In relation to a door opening apparatus according to the generic type, with the invention it is in particular proposed that the door opening apparatus has a mechanical bracing unit that is configured so as to influence the plunger using a force so as to mechanically brace the plunger head against the door inner side at least in the closed state of the door and at least in the absence of the application of the electrical voltage to the stator winding.

In relation to a household appliance according to the generic type, the invention in particular proposes that the door opening apparatus is configured in accordance with the invention.

In relation to a method of the generic type, with the invention it is in particular proposed that the door opening apparatus is operated in the closed state of the door at least temporarily in a passive state in which the plunger is only influenced in the direction of the door by the drive unit using a bracing force that is smaller than the opening force, wherein by means of a sensor unit a stroke of the plunger is detected and a sensor signal is allocated to the detected stroke, wherein the sensor signal that is allocated to the stroke is compared with at least one first comparison value and a switch is made from the passive state into the active state in dependence upon the first comparison.

In relation to a door opening apparatus of the generic type, with the invention in particular it is proposed that the door opening apparatus has a sensor unit for detecting a stroke of the plunger and for allocating a sensor signal to the detected stroke. The door opening apparatus is configured in the closed state of the door so as to be operated at least temporarily in a passive state in which the plunger is only influenced in the direction of the door by the drive unit using a bracing force that is smaller than the opening force, to compare the sensor signal that is allocated to the stroke with at least one first comparison value and to switch from the passive state into the active state in dependence upon the first comparison.

The invention is based inter alia on the fact that the door closes an access opening of a body of the household appliance to an interior space of the household appliance by virtue of the fact that at least one door inner side of the door braces against an elastic seal that is arranged on the body and circumferentially around the access opening, or an elastic seal that is arranged on the door inner side braces circumferentially against a region of an edge of the access opening. In the closed state of the door, due to the elastic seal it is achieved that an actuation by the user, for example in the form of an exertion of pressure that can be exerted as a manual actuation or the like, can cause a limited pivoting movement that can be detected and evaluated by means of the apparatus for determining the actuation of the door of the household appliance by the user in order to allocate a sensor signal. This sensor signal can then be supplied to the drive unit of the door opening apparatus in order to cause the door to open.

The plunger, in particular the plunger head, does not need to be permanently mechanically fixedly connected to the door inner side or the door. The bracing abutment can, for example, be automatically released when the door is opened by a predetermined pivot angle or a pivot angle that can be predetermined relative to the closed state. As soon as the user closes the door, the plunger can, for example, be moved by means of the closing movement back into a starting position in that the door inner side presses against the plunger head and moves this plunger head along until the fully closed state of the door. However, it can also be provided that after causing the door to open, the drive unit actively moves the plunger into a retracted position, and the plunger is only influenced using the bracing force by the drive unit after the door is closed. It is thereby possible for the plunger head to be moved back towards the door inner side until it rests against the door inner side.

The plunger can have at least a round or an angular cross-sectional shape. It is preferred that the plunger is circular or rectangular in cross section. The cross-sectional shape of the plunger is preferably substantially constant over its axial extent. In the region of the first end, however, this can also be provided in a deviating manner. The plunger head can have the same cross-sectional shape as the plunger. However, the plunger head can also have a curved spherical shape. In terms of a cross-sectional area, the plunger head can be smaller or also larger than a cross-sectional area of the plunger in the longitudinal extent.

Thus, unlike in the prior art, in the case of the invention it is not a pressure that is detected using the sensor unit, but rather actually the stroke that is performed by the plunger is detected. This can take place, for example, by means of a displacement sensor or the like.

The first comparison value can, for example, be ascertained empirically and can preferably include a change in stroke within a predetermined period of time or the like. In dependence upon the first comparison, the actuation by the user can then be determined. For this purpose, the door opening apparatus can have a control unit, which can be configured, for example, as an electronic control unit and which can be coupled to the sensor unit in terms of communication or signaling in order to receive the sensor signal from the sensor unit. The control unit can, for example, be configured as an electronic hardware circuit. It can have a program-controlled computer unit in order to be able to realize the desired functionality. The control unit can also be formed entirely by the computer unit. A combination of a hardware circuit with the computer unit is also feasible. Furthermore, it can also be provided that the control unit exclusively comprises a hardware circuit. The control unit can also be at least partially included in a superordinate control unit of the household appliance. However, the control unit can also be provided as a separate component in the household appliance. It is preferred that the control facility is at least partially part of the apparatus for determining the actuation of the door of the household appliance by the user.

The door opening apparatus can have a housing, for example an apparatus housing or the like, in which the elements or units of the door opening apparatus are at least partially arranged. Thus, it can be provided that the plunger is at least partially movably arranged in the housing. It is thereby possible, by positioning the door opening apparatus on the body of the household appliance, to also be able to orient the plunger in relation to its position relative to the door inner side in the closed state of the door. The door opening apparatus can further have, in the housing, the drive unit that is coupled to the plunger so as to move the plunger. For this purpose, it can be provided that the drive unit has an electric machine, in particular a rotating or rotatable electric machine, which has a rotor that is arranged rotatably relative to a stator that is arranged in a rotationally fixed manner. The rotor is preferably connected to the plunger via a gearing mechanism so that the desired drive functionality can be achieved.

The invention is based, inter alia, on the idea that the plunger head can already rest against the door inner side in the closed state of the door. If the door is to be caused to open, it is not necessary to move the plunger until it rests against the door inner side but rather it is possible to directly influence the door, in particular the door inner side. This then also naturally applies in reverse, with the result that it is possible to achieve that the door opening apparatus is not just to be used to cause the door of the household appliance to open but rather to provide the possibility of using this door opening apparatus simultaneously also as the sensor unit for an opening state of the door, a manual actuation by a user and/or the like. It is thus possible inter alia also for a door opening request of the user to be determined or detected. With respect to the prior art, it is consequently no longer required to provide a separate sensor unit for this purpose. This can consequently be omitted entirely because the door opening apparatus itself simultaneously also provides the sensor functionality.

Furthermore, the invention renders it possible due to the use of two alternately usable states, namely the active state and the passive state, in particular if the door is in the closed state, to at least temporarily take up the passive state so that an energy consumption by the door opening apparatus and consequently by the household appliance overall can be reduced. It is thereby possible to save not just energy in relation to the door opening apparatus but rather there is immediately also the possibility of reducing energy consumption in relation to the sensor functionality of the door opening apparatus. It is thus possible for example in the passive state for units of the door opening apparatus that are not required to be deactivated. This can be achieved by virtue of the fact that the plunger only needs to be influenced in the direction of the door by the drive unit using a bracing force. The bracing force is on the one hand smaller than the opening force that is required in order to move the door into the at least in part opened state by means of the door opening apparatus. For example, it is sufficient if the bracing force is of such a magnitude that the plunger or its plunger head rests against the door inner side in the closed state of the door and can preferably be adjusted in the case of actuation by the user. The bracing force can thus be a particularly small force. On the other hand, in the passive state the sensor unit only needs to be supplied with energy in so far as the function of the detection or sensing of the stroke of the plunger needs to be active. Further functionalities of the sensor unit, such as for example the comparison functionality or the like, can consequently likewise be operated in a low consumption or a consumption-less state. These functionalities only need to be activated if a stroke change of the plunger is detected.

The invention achieves this, inter alia, by the fact that in the closed state of the door the plunger or its plunger head is braced against, or rests against, or touches the door inner side. It is thereby possible that the plunger does not need to perform any further stroke after making contact with the door inner side provided that an external influence is not present on the door such as in the case of a manual actuation by the user. This renders it possible inter alia to detect by means of the plunger the manual actuation by the user, which can be manifested at least in a slight movement of the door. The bracing force renders it possible in this case that the plunger or its plunger head can perform a stroke in dependence upon the movement of the door.

The door opening apparatus can detect the stroke of the plunger. It is possible therefrom for the door opening apparatus within the scope of its sensor functionality to determine the actuation of the door and to provide a corresponding sensor signal. For this purpose, the door opening apparatus contains the sensor unit that is configured so as to detect the stroke of the plunger and to allocate a sensor signal to the detected stroke. This sensor signal can be evaluated in order to make a decision as to whether a switch from the passive state to the active state and/or from the active state to the passive state is to be made. For this purpose, the invention provides that the sensor signal is compared by a control unit of the door opening apparatus to at least one first comparison value. This comparison value can be ascertained empirically or it can also be calculated and is preferably selected in such a manner that the actuation by the user can be reliably determined. In dependence upon the first comparison that is performed in this manner, it is then possible to switch from the passive state into the active state. It is thereby possible that the passive state can prevail predominantly in the closed state of the door in terms of time in that an energy consumption of the door opening apparatus can be considerably reduced. It is preferred that the energy consumption can even be zero. For this purpose, for example it can be provided that the door opening apparatus has a separate, for example small, energy storage device that is capable of providing sufficient energy for the pure sensor functionality. It is thereby possible to achieve that the door opening apparatus essentially does not need to be supplied with any energy, in particular electrical energy, when not in the active state, in other words during the passive state.

Unlike in the prior art, it is therefore preferably provided in the case of the invention that during the closed state of the door a continuous mechanical contact occurs between the plunger head and the door inner side. In this context, "door open" means that the door is no longer closed.

In the active state, the drive unit can be activated with respect to the drive so as to open the door, in other words so as to apply the opening force. For this purpose, it can be provided that a coupling in terms of energy is provided to an energy source, for example an electrical energy source such as the public energy supply network or the like. In the passive state, this coupling can be interrupted. It can be provided that the active state is only provided during the application of the opening force. It can however also be provided that the active state lasts longer than a state of the application of the opening force. The active state can be terminated in an automated manner with the closing of the door. For this purpose, a corresponding sensor functionality can be provided. It can however also be provided that the active state remains activated after the closing of the door for a predetermined period of time and a switch to the passive state is only made after this period of time.

In accordance with a further development, it is proposed that the opening force is applied immediately after the switch to the active state by the drive unit. It is thereby possible to also cause the door to open at the same time as the switch from the passive state to the active state. It is thus not necessary to provide any separate control signal for the drive unit in order to cause the door to open. On the contrary, the sensor signal that is already provided can be used both for the switch from the passive state into the active state as well as for the activation of the drive unit so as to provide the opening force. It is thereby possible to achieve a particularly simple realization of the invention.

In accordance with one development, it is proposed that the sensor signal that is allocated to the stroke is compared with a second comparison value that has a greater value than the first comparison value and the opening force is applied by the drive unit in dependence upon the second comparison. In the case of this embodiment, it is possible to draw upon a value of the sensor signal for the second comparison. It is provided that the sensor signal is only used so as to activate the drive unit if this appears to be desired due to an accordingly strong actuation by the user. As a consequence, it is possible to avoid that an accidental slight actuation of the door already leads to the opening of the door. It is thus also possible to simultaneously achieve that the drive unit is initially transferred into an activated state so that the drive unit can then reliably realize its intended function of applying the opening force owing to the second comparison.

It is further proposed that a closing of the door is detected and a switch is made from the active state into the passive state after a predetermined period of time since the detection of the closing of the door. The detection of the closing of the door can be performed by means of a suitable sensor. Furthermore, the plunger can also naturally be used to detect the closing of the door in that the plunger is moved into a position that is extended accordingly far so that as the door is being closed the plunger performs a return stroke due to the bracing abutment and the return stroke can be detected by means of the door opening apparatus as a closing of the door. Due to the predetermined period of time it is now possible to achieve that the drive unit is not brought immediately after the closing of the door into a deactivated state.

The drive unit is thus still available for the predetermined period of time for drive functions that are further explained below. The predetermined period of time can be for example a few seconds, however it can also be one or more minutes.

Furthermore, it is proposed that the plunger head is brought into the bracing abutment against the door inner side prior to the switch from the active state to the passive state. It is thereby possible to reliably achieve the sensor functionality of the door opening apparatus even after the door is closed, in particular after the switch from the active state to the passive state.

It is particularly advantageously proposed that the plunger is influenced using the bracing force. For this purpose, it is likewise possible to use the drive unit which can apply the corresponding bracing force prior to the switch from the active state to the passive state. It can however also be provided that the bracing force can be applied using the plunger itself, for example in that the plunger head has a magnet that interacts with a magnetizable region of the door inner side and applies the bracing force in this manner or that the plunger has a spring element that is capable of applying the bracing force in the closed state of the door and in the passive state, and the spring element is used as an energy store and can be charged by means of the drive unit according to the application of the bracing force. In the case of this embodiment, it can be provided that after achieving the bracing force a brake of the drive unit determines the position of the plunger and provides the corresponding bracing force to the energy store. It is thus also possible here for the drive unit to take up the passive state, wherein the bracing force can be provided at the same time.

It is further proposed that the plunger in the opened state of the door is moved by means of the drive unit into a predetermined maximum extended position and the closing of the door is determined after detecting a return stroke of the plunger. It is thus possible for the door opening apparatus to simultaneously also be used to determine the closing of the door with the result that a separate closing sensor is not required for the door. This function can be provided both for the passive state as well as for the active state. It is however preferred that this function is provided at least for the active state.

It is preferred that the return stroke is detected by means of the sensor unit. It is thus not necessary to provide a separate sensor unit for the detection of the return stroke. It is consequently possible without additional outlay to also detect the closing of the door.

In accordance with one development, it is proposed that the drive unit has a rotating electric machine, which has rotors that are arranged rotatably relative to a stator, a control unit that is connected to a stator winding of the stator, a gearing mechanism for mechanically coupling the rotor to the plunger in terms of drive and also an energy store for providing the bracing force, wherein the bracing force is provided in the passive state at least temporarily by the energy store. The energy store can be formed for example by the spring element that is already explained above or also by the magnet in conjunction with the magnetizable region of the door. As is already at least in part explained above, the drive unit can be used so as to apply the bracing force in that for example the energy store, which can be configured in this case as a spring element, is influenced using the corresponding bracing force. It is possible by means of a gearing mechanism brake that is arranged on the gearing mechanism to achieve that the electric machine or the control unit can be deactivated with the result that a supply of energy is no longer required for the provision of the bracing force. The energy store can then assume this. A gearing mechanism brake does not need to be provided if the plunger head has the magnet that interacts with the magnetizable region of the door inner side. In this case, the bracing force can be provided by magnetism.

Furthermore, it is proposed that the energy store is provided by means of the gearing mechanism. For this purpose, the gearing mechanism can have a body that is accordingly elastically deformable, for example a helical spring or the like by means of which the bracing force can be stored and can be provided to the plunger in the passive state. It is thereby possible to be able to provide the energy store in a compact and constructively simple manner.

Furthermore, it is proposed that while providing the bracing force by the energy store, a supply of electrical energy to the drive unit, in particular the control unit, is reduced. It is preferred that the supply of electrical energy to the drive unit is even interrupted. The control unit of the drive unit preferably has an electrical energy converter or electrical energy transformer that is adapted to the electric machine, for example a DC/DC converter if the electric machine is a DC machine or an inverter if the electric machine is an AC machine. It is preferred that the electric machine is a multi-phase AC machine and the inverter is configured accordingly. The reduction of the supply of electrical energy can be controlled for example in dependence upon the switch from the active state into the passive state.

It is preferred that the energy store is adjusted or charged by means of the electric machine so as to provide the bracing force. This development is particularly suited for the case that the energy store has a spring element. This spring element can be accordingly preloaded using the electric machine so as to provide the bracing force with the result that after the switch to the passive state, the energy store is capable of providing the bracing force to the plunger. It is thus not necessary to provide a separate facility in order to render possible the corresponding preloading in the case of the energy store or a corresponding charging of the energy store. This function can be realized assisted by the control unit.

In relation to the household appliance, it is further proposed that the door closes the access opening of the body of the household appliance to the interior space of the household appliance by virtue of the fact that at least one door inner side of the door braces against an elastic seal that is arranged on the body and circumferentially around the access opening, or an elastic seal that is arranged on the door inner side braces circumferentially against a region of an edge of the access opening. This construction renders it possible for the door to be capable of performing, albeit a small, pivoting movement owing to the elasticity of the seal in the case of an actuation by the user, and the pivoting movement results in a corresponding stroke of the plunger that can be detected so as to determine the actuation by the user.

In accordance with a fourth aspect, the invention relates to a door opening apparatus for causing a door of a household appliance to open, having a plunger which is arranged movably in the direction of a longitudinal axis of the plunger. The longitudinal axis of the plunger can be oriented in a transverse manner with respect to a door inner side in the closed state of the door. On the door side the plunger has a first plunger end with a plunger head, a rotating electric machine that has a rotor that is arranged rotatably relative to a stator, a gearing mechanism that is mechanically coupled to the rotor and the plunger for mechanically coupling, in terms of drive, the rotor to the plunger, and a control facility that is electrically coupled to a stator winding of the stator and is configured so as to apply an electrical voltage to the stator winding so as to assist the opening of the door at least temporarily during a temporary bracing abutment of the plunger head against the door inner side. Furthermore, the invention relates to a household appliance having a body that has an interior space and an access opening for the interior space, a door for closing the access opening, wherein the door is pivotably arranged on the body about an at least partially vertical or horizontal axis in a first region of an edge of the access opening, and a door opening apparatus that is arranged on the body outside the first region for causing the door to open. Finally, the invention also relates to a method for causing a door of a household appliance to open by means of a plunger that is arranged movably in the direction of a longitudinal axis. The longitudinal axis of the plunger is oriented in a transverse manner with respect to a door inner side in the closed state of the door, and on the door side the plunger has a first plunger end with a plunger head. The plunger is driven by means of a rotating electric machine, which has a rotor that is arranged rotatably relative to a stator, for which purpose the rotor and the plunger are mechanically coupled in terms of drive by means of a gearing mechanism. A stator winding of the stator, which is electrically coupled to a control facility, is influenced using an electrical voltage in order to cause the door to open at least temporarily during a temporary bracing abutment of the plunger head against the door inner side.

Door opening apparatuses, household appliances having door opening apparatuses and also methods for causing the door of a household appliance to open are extensively known in the prior art, so that separate printed proof is not required in this respect. Door opening apparatuses are used so as to cause, for example to assist or to enable, the door of a household appliance to open by a user so that access to the interior space of the body of the household appliance is rendered possible for the user via the access opening. Household appliances of this type are for example cooling appliances or refrigeration appliances, washing machines, dryers, dishwashers or the like. Household appliances of this type in general have a body having an interior space to which the user requires access for the intended use of the household appliance. The access is typically provided through the access opening. During the intended operation or the intended function of the household appliance, the access opening is in general closed by means of the door. In the case of a cooling appliance or refrigeration appliance, for example an access is however also possible during the intended operation. Meanwhile, it is in particular known in the case of cooling appliances or refrigeration appliances to design the door without a door handle. If a user wishes to access the interior space of the cooling appliance or refrigeration appliance, they thus press with a hand against the door, whereupon a door opening sensor detects this manual actuation and actuates a door opening mechanism that either fully or at least in part opens the door with the result that a user can fully open the door by gripping behind it. In this context, for example DE 10 2014 107 367 A2 discloses a corresponding cooling appliance.

Even if the prior art has proven itself, disadvantages nevertheless remain. In particular, the design in DE 10 2014 107 367 A1 is comparatively complex in terms of functionality and requires a lot of space. As a result, the opening mechanism in DE 10 2014 107 367 A1 can only be arranged at a few selected locations on the body of the household appliance. Furthermore, the use of a piezo sensor proves to have limited reliability. Furthermore, it has proven disruptive that the door opening mechanism in DE 10 2014 107 367 A2 can cause a loud impact noise as the opening of the door is caused.

The object of the invention is to provide an improved door opening apparatus in which the outlay can be reduced, a noise level and/or the reliability can be improved.

As a solution, with the invention in accordance with the fourth aspect, a door opening apparatus, a household appliance and also a method in accordance with the independent claims are proposed.

Advantageous developments are provided by features of the dependent claims.

In relation to a door opening apparatus according to the generic type, with the invention it is in particular proposed that the door opening apparatus has a mechanical bracing unit that is configured so as to influence the plunger using a force so as to mechanically brace the plunger head against the door inner side at least in the closed state of the door and at least in the absence of the application of the electrical voltage to the stator winding.

In relation to a household appliance according to the generic type, the invention in particular proposes that the door opening apparatus is configured in accordance with the invention.

In relation to a method according to the generic type, with the invention it is in particular proposed that the plunger is influenced using a force by means of a mechanical bracing unit so as to mechanically brace the plunger head against the door inner side at least in the closed state of the door and at least in the absence of the application of the electrical voltage to the stator winding.

The invention is based, inter alia, on the idea that the plunger head can already rest against the door inner side in the closed state of the door. If the door is to be caused to open, it is not necessary to move the plunger until it rests against the door inner side but rather it is possible to directly influence the door, in particular the door inner side. It is thus possible to reduce the amount of noise generated. Further, the door opening apparatus can not only be used to cause the door of the household appliance to open, but rather the possibility is also provided to simultaneously use this door opening apparatus as a sensor for an opening state of the door, a manual actuation by a user and/or the like, so that, inter alia, a door opening request of the user can also be detected. Compared to the prior art, it is thereby also no longer necessary to provide a separate sensor unit for this purpose. This can be omitted entirely because the door opening apparatus itself also simultaneously provides the sensor functionality.

The invention achieves this, inter alia, by the fact that in the closed state of the door the plunger or its plunger head is braced against, or rests against, or touches the door inner side. It is thereby possible that the plunger does not need to perform a stroke until making contact with the door inner side. A manual actuation by the user, which can be manifested at least in a slight movement of the door, can thereby also be detected inter alia by means of the plunger, wherein the door opening apparatus can detect the movement of the plunger that is consequently caused. The detection operation in this case is preferably coupled to a situation in which the electrical voltage is no longer applied to the stator winding. It is thereby in addition possible to use the stator winding to detect a stroke of the plunger and to accordingly evaluate an induced voltage. This explains why the mechanical bracing unit influences the plunger using a force so that the plunger head is mechanically braced against the door inner side.

Unlike in the prior art, it is therefore preferably provided in the case of the invention that during the closed state of the door a continuous mechanical contact occurs between the plunger head and the door inner side.

In this context, "door open" means that the door is no longer closed.

The electric machine can, for example, be configured as a single-phase or multi-phase AC machine, a stepper motor or also a DC machine. To cause the door to open, the electrical voltage is applied by the control facility to the stator winding of the electric machine or the stator of the electric machine. This produces a motor effect which is converted via the gearing mechanism into a translational force on the plunger, so that the plunger can be influenced using a force in the direction of the door inner side and which is suitable for causing the door to open. Since only a temporary bracing abutment of the plunger head against the door inner side is provided, it is then possible for the plunger to be moved only a small stroke in order to push the door open, so that the user can grip behind an edge of the door and thereby fully open the door.

The plunger, in particular the plunger head, thus does not need to be permanently mechanically fixedly connected to the door inner side or the door. In the opened state, the plunger head can be spaced from the door inner side with the result that for example a mechanical contact is no longer necessary. As soon as the user closes the door, the plunger can, for example, be moved by means of the closing movement back into a starting position in that the door inner side presses against the plunger head and moves this plunger head along until the fully closed state. However, it can also be provided that after causing the door to open by applying a further, different electrical voltage to the stator winding, the plunger is actively moved into a retracted position and only after closing the door is the force applied again by means of the mechanical bracing unit, so that the plunger head is moved towards the door inner side until the plunger head rests against the door inner side.

The plunger can have at least a round or an angular cross-sectional shape. It is preferred that the plunger is configured as circular or rectangular. The cross-sectional shape of the plunger is preferably substantially constant over its axial extent. In the region of the first end, however, this can also be provided in a deviating manner. The plunger head can have the same cross-sectional shape as the plunger. However, the plunger head can also have a curved spherical shape. In terms of a cross-sectional area, the plunger head can be smaller or also larger than a cross-sectional area of the plunger in the longitudinal extent.

The electric machine is in general configured as a rotating or rotatable electric machine and is likewise extensively known in the prior art, so that as in the case of the household appliance, separate printed proof is not required in this respect. A rotating electric machine is an apparatus which converts electrical energy into mechanical energy, in particular into rotational energy, in a motor operation and/or mechanical energy into electrical energy in a generator operation. The movement is in general a rotational movement that is performed by a rotor of the rotating electric machine, the rotor being arranged rotatably relative to a stator of the rotating electric machine. In contrast to the rotor, the stator is in general arranged in a rotationally fixed manner, in other words a rotational movement is a rotational movement of the rotor relative to the stator. The rotor is arranged rotatably mounted relative to the stator, wherein an air gap is in general formed between the rotor and the stator.

In the intended operation, the stator and the rotor are linked by means of a magnetic flux, whereby in the motor operation the force effect or the torque is provided which drives the rotor in rotation relative to the stator. In the generator operation, mechanical energy that is supplied to the rotor in the form of a rotation in conjunction with a torque is converted into electrical energy. For this purpose, at least the stator has an electric winding through which an electric current flows, also called stator winding. The rotor can likewise have an electric winding as a rotor winding and/or one or more permanent magnets.

For the intended operation, the electrical voltage is applied to the stator winding. Depending upon the construction of the electric machine, in particular its stator winding, a single-phase or also a multi-phase stator winding can be provided, for example, for the application of an alternating voltage, and a single-phase or multi-phase electrical alternating voltage is accordingly applied to said stator winding. A multi-phase alternating voltage in general has phase alternating voltages corresponding to the number of phases and said phase alternating voltages in general have approximately the same frequency and approximately the same amplitude, but are shifted with respect to one another in terms of their phase position. A very common multi-phase alternating voltage is, for example, a three-phase alternating voltage in which the phase voltages are each shifted in phase by 120° with respect to one another. Such an alternating voltage is also used, for example, in the public power supply network. In this regard, the gearing mechanism is preferably configured in such a manner that it can not only convert a rotational movement of the rotor into a translational movement of the plunger, but rather is also capable of converting a translational movement of the plunger into a rotational movement of the rotor.

The control facility is preferably configured as an electronic hardware circuit and can have a program-controlled computer unit in order to realize the desired functionality. In particular, the control facility, in particular the hardware circuit, can have a DC/DC converter, an inverter and/or the like for applying the electrical voltage to the stator winding. Naturally, the control facility can also be formed only by the computer unit or also have a combination of a hardware circuit with the computer unit. For this reason however, it is also possible for the control facility to comprise only a hardware circuit. The control facility can also be at least partially included in a superordinate control facility of the household appliance. However, the control facility can also be provided as a separate component in the household appliance. In particular, the control facility is provided at least partially as part of the door opening apparatus.

In accordance with one advantageous development, it is proposed that the plunger is arranged in an axially movable manner in a sleeve that is made from an elastic material and that is closed on the head side. The sleeve can be formed from an elastic plastic, rubber, a fiber reinforced elastic plastic and/or the like. The sleeve is configured so as to surround at least the first end of the plunger, which comprises the plunger head. Closed on the head side in the present case means in particular that the plunger head is arranged in the region of the closed end of the sleeve. Owing to its elasticity, the sleeve itself does not need to be arranged in an axially movable manner. It is preferred that the plunger is therefore mounted in an axially movable manner in the sleeve. For example, the sleeve can be used so as to fix the plunger with respect to its radial position. A wall thickness of the sleeve in a head region in which the plunger head is arranged can be in particular greater than in an adjoining longitudinal region. The sleeve can consequently be used to guide the plunger.

It is further proposed that the door opening apparatus has a housing, wherein the sleeve can be detachably connected to a housing flange of the housing. The housing flange can be configured as adapted to the sleeve. It is preferred that the housing flange is configured so as to provide an opening for passing the plunger through. The sleeve can be at least in part fixed in its position in relation to the housing due to the connection to the housing flange. The housing flange can consequently represent an axial continuation of the sleeve with the result that it is possible to achieve a fixed arrangement of the sleeve on the housing. The sleeve can be able to be plugged or can also be able to be connected by means of a screw or clamp connection to the housing flange. Furthermore, there is the possibility of providing separate connecting means in order to be able to connect the sleeve to the housing flange. Such a connecting means can be for example a bracket.

In accordance with one development, it is proposed that the bracing unit has a magnet for interacting with a magnetizable bracing region of the door inner side, wherein the magnet is arranged on the plunger head. It is thereby possible for the bracing unit to be realized in a particularly simple manner, because the plunger head can be braced against the door inner side due to the magnetic interaction, in particular in the closed state of the door. Furthermore, the temporary bracing abutment of the plunger head against the door inner side can also be achieved particularly easily in this way, because as the door is being opened by the user, the connection between the magnet or the plunger head and the magnetizable bracing region of the door can be released in a simple manner by applying an appropriate force. This allows the door to be swung wide open by the user without obstructing the access of the user through the access opening. As soon as the door is closed again by the user, the connection can be re-established in that the magnetizable bracing region is produced using the plunger head or its magnets via magnetic interaction, so that a bracing of the plunger head can be reliably achieved at least during the closed state of the door. This bracing unit furthermore has the advantage that it can be operated in a particularly reliable and continuous manner and can be particularly insensitive with respect to disruptive influences such as dirt, moisture and/or the like.

In accordance with one development, it is proposed that the bracing unit has a spring element for influencing the plunger using a force. The force that is applied by means of the spring element is preferably directed in the direction of the door inner side in the closed state of the door, so that the plunger head can be braced against the inner side of the door. The spring element can be configured, for example, as a disc spring, a leaf spring or a helical spring. As a helical spring, it is preferably configured in such a manner that it at least partially surrounds the plunger in the radial direction and is braced against a radial projection or collar of the plunger. On the opposite side, the spring element can be braced against the housing.

It is preferred that the spring element is arranged at least in part within the sleeve. This development has proven particularly advantageous for the case that the spring element is configured as a helical spring. It is consequently possible to form a unit from the spring element and the plunger, which can be handled individually. In addition, the unit can also at least in part comprise the sleeve.

In accordance with one development, it is proposed that the door opening apparatus has a stop for limiting a maximum extended position of the plunger head. The stop can be provided for example on the housing side or also on the sleeve side. The stop can interact with a projection or a recess of the plunger. By limiting the maximum extended position of the plunger, it can be achieved that the plunger in the maximum extended position in an open state of the door impedes the user as little as possible in accessing the interior of the body. In particular, it is consequently possible to improve the ergonomics and safety.

In accordance with one advantageous development, it is proposed that the door opening apparatus has a position sensor for detecting a position of the plunger head. As a consequence, it is possible to achieve that for example at least the opened state or also the closed state of the door can be detected. There is then the possibility in certain circumstances in dependence upon the detected position to output a corresponding message. The position sensor can be configured so as to detect at least a single position of the plunger. This can be for example the closed state of the door. Furthermore, it is possible by means of the position sensor to also detect the opened state of the door. It can also be provided that more than only a single position of the plunger head is detected by means of the position sensor. In particular, naturally the positions of the plunger can be detected in the closed and in the opened state of the door.

It is further proposed that the control facility is configured so as in the absence of the application of the electrical voltage to the stator winding to detect an electrical voltage that is induced in the stator winding, to compare it with a comparison value that can be predetermined and so as to determine in dependence upon the comparison a manual actuation to open the door by the user. This renders it possible to simultaneously also be able to use the door opening apparatus as a sensor for a manual actuation by the user. It is consequently no longer necessary to provide a separate detecting apparatus such as the sensor unit of the prior art and as a consequence the sensor unit can be omitted. This increases the reliability of the door opening apparatus and renders it possible to reduce its installation size and outlay with the result that the flexibility with regard to the arrangement of the door opening apparatus on the door can be increased.

In relation to the household appliance, it is further proposed that a door inner side of the door in a door region, which lies opposite the door opening apparatus in the closed state of the door, has at least in part a magnetizable material as a magnetizable bracing region. The magnetizable material can feature for example iron, cobalt, nickel or the like. Naturally, alloys of these that have ferromagnetic properties can also be provided. The magnetizable material can form the entire door inner side. It is however also possible to provide that the magnetizable material is only provided in the magnetizable bracing region. In this manner, it is possible to achieve a simple use with a door opening apparatus and the bracing unit of the door opening apparatus has a magnet.

It is further proposed that the magnetizable material is formed at least in part by a ferromagnetic plate that can be at least in part adjusted with regard to its position and orientation. The ferromagnetic plate can be arranged as a separate component as a magnetizable bracing region on the door inner side. For example, the ferromagnetic plate can be connected by means of screws, adhesives, clamps or the like to the door inner side. It is preferred that the ferromagnetic plate however can be at least in part adjusted with the result that for example a position with respect to a surface of the door inner side can be changed in that the ferromagnetic plate can be adjusted for example with regard to a protrusion with respect to the door inner side or the like. It can also be provided that the ferromagnetic plate can be pivoted or twisted with respect to a surface of the door inner side. As a consequence, the function of the invention can be further improved.

In relation to the household appliance, it is further proposed that the axis is a vertical axis and the first region is a vertical edge of the access opening, wherein the door opening apparatus is arranged at least above or below the access opening on the body. As a consequence, it is possible to achieve a reliable construction of the household appliance that can continuously ensure a reliable function of the door opening apparatus. Altogether, the function of the household appliance can thereby be further improved.

In relation to a method of the generic type, with the invention it is in particular further proposed that the control facility in the absence of the application of the electrical voltage to the stator winding detects an electrical voltage that is induced in the stator winding, compares with a predetermined comparison value and in dependence upon the comparison determines a manual actuation to open the door by a user. Due to this embodiment, it is possible to achieve the use of the door opening apparatus as a sensor unit with the result that it is no longer required to provide a separate sensor unit, as is customary in the prior art. Altogether, it is consequently possible to improve the outlay and the reliability of the door opening apparatus.

In accordance with a fifth aspect, the invention relates to a door opening apparatus for causing a door of a household appliance to open, having a plunger which is arranged movably in the direction of a longitudinal axis of the plunger, wherein the longitudinal axis of the plunger can be oriented in a transverse manner with respect to a door inner side in the closed state of the door, and on the door side the plunger has a first plunger end with a plunger head, a rotating electric machine that has a rotor that is arranged rotatably relative to a stator, a gearing mechanism that is mechanically coupled to the rotor and the plunger for mechanically coupling, in terms of drive, the rotor to the plunger, and a control unit that is electrically coupled to a stator winding of the stator and is configured so as to apply an electrical voltage to the stator winding so as to assist the opening of the door at least during a temporary bracing abutment of the plunger head against the door inner side. Furthermore, the invention relates to a household appliance having a body that has an interior space and an access opening for the interior space, a door for closing the access opening, wherein the door is pivotably arranged on the body about an at least partially vertical or horizontal axis in a first region of an edge of the access opening, and a door opening apparatus that is arranged on the body outside the first region for causing the door to open. Finally, the invention also relates to a method for causing a door of a household appliance to open by means of a plunger that is arranged movably in the direction of a longitudinal axis, wherein the longitudinal axis of the plunger is oriented in a transverse manner with respect to a door inner side in the closed state of the door, and on the door side the plunger has a first plunger end with a plunger head. The plunger is driven by means of a rotating electric machine, which has a rotor that is arranged rotatably relative to a stator, for which purpose the rotor and the plunger are mechanically coupled in terms of drive by means of a gearing mechanism. A stator winding of the stator, which is electrically coupled to a control unit, is influenced using an electrical voltage in order to cause the door to open at least during a temporary bracing abutment of the plunger head against the door inner side.

Methods, apparatuses and also household appliances of the generic type are extensively known in the prior art with the result that printed proof is not required in this respect. In the case of many household appliances, it is meanwhile customary that the opening of the door of the household appliance is performed in an at least in part automated manner in that a door opening mechanism of the household appliance is activated and owing to an opening signal the door opens at least by an angle that can be predetermined with the result that a user can grip behind the door even if the door is configured without a door handle, and can pivot the door into the fully opened position. Furthermore, it is naturally possible that the door opening mechanism also fully opens the door.

In particular in the case of household refrigeration appliances, it is meanwhile customary that the door does not have a door handle or handle for manual actuation by the user. In the case of household appliances of this type, which have a door without a handle, the user performs an, in particular manual, actuation of the door, for example in that they press against the door in an edge region of the door. This actuation can be detected by means of a sensor unit of the household appliance, which then provides a corresponding opening signal for the door opening mechanism.

In particular in the case of household cooling appliances or household refrigeration appliances, it is meanwhile known to design the door without a door handle or handle. If a user wishes to access the interior space of the household cooling appliance or household refrigeration appliance, they thus press for example with one hand against the door whereupon the sensor unit detects this manual actuation and provides a sensor signal by means of which the door opening mechanism is actuated and the door is then either fully or at least in part opened using the door opening mechanism. In this context, for example DE 10 2014 107 367 A1 discloses a corresponding cooling appliance. Moreover, US 2018/0187470 A1 discloses a cooling appliance. Furthermore, EP 2 194 347 A2 discloses a refrigeration appliance and a method for its control.

Even if the prior art has proven itself, disadvantages nevertheless remain. The above-mentioned constructions are comparatively complex with regard to the functionality and require a lot of space. As a consequence, these opening mechanisms can only be arranged at a few selected locations on the body of the household appliance. Furthermore, it proves troublesome that the door opening mechanisms result in a not inconsiderable energy consumption in the absence of opening.

The object of the invention is to provide an improved door opening apparatus in which the energy consumption and/or the outlay, in particular in relation to detecting an opening state of the door, can be reduced.

As a solution, with the invention in accordance with the fifth aspect, a door opening apparatus, a household appliance and also a method in accordance with the independent claims are proposed.

Advantageous developments are provided by features of the dependent claims.

In relation to a door opening apparatus according to the generic type, with the invention it is in particular proposed that the door opening apparatus has a mechanical bracing unit that is configured so as to influence the plunger using a force so as to mechanically brace the plunger head against the door inner side at least in the closed state of the door and at least in the absence of the application of the electrical voltage to the stator winding, and a position sensor for detecting at least one position of the plunger.

In relation to a household appliance according to the generic type, the invention in particular proposes that the door opening apparatus is configured in accordance with the invention.

In relation to a method according to the generic type, with the invention it is in particular proposed that the plunger is influenced using a force by means of a mechanical bracing unit so as to mechanically brace the plunger head against the door inner side at least in the closed state of the door and at least in the absence of the application of the electrical voltage to the stator winding, and at least one position of the plunger is detected by means of a position sensor.

The invention not only uses the door opening apparatus so as to cause the door to open but rather the invention introduces the possibility of also using the door opening apparatus so as to be able to determine an opening state of the door. In this case, the invention utilizes the fact that the plunger at least in an opening state, which corresponds to a closed state of the door, rests against the door inner side, touches this door inner side or mechanically contacts this door inner side and namely owing to the bracing force even then if the door performs smaller mechanical pivoting movements such as occur for example during the actuation by the user. By virtue of the fact that the plunger is influenced using a force so as to mechanically brace the plunger head against the door inner side, it is possible by means of ascertaining the position of the plunger to also determine the opening state of the door, for example the closed state and/or the opened state of the door. A separate detection apparatus is thus not required for this purpose, as for example is taught in US 2018/0187470 A1. An additional outlay for upgrading the door opening apparatus so that it is capable of determining any opening state of the door can thereby be kept particularly low with respect to the prior art. Predominantly, the construction that is provided by the door opening apparatus can be used in order to be able to realize this function.

The Invention is preferably based inter alia on the fact that the door closes an access opening of a body of the household appliance to an interior space of the household appliance by virtue of the fact that at least one door inner side of the door braces against an elastic seal that is arranged on the body and circumferentially around the access opening, or an elastic seal that is arranged on the door inner side braces circumferentially against a region of an edge of the access opening. In the closed state of the door, due to the elastic seal it is achieved that an actuation by the user, for example in the form of an exertion of pressure that can be exerted for example as a manual actuation or the like, can cause a limited pivoting movement that can be detected and evaluated by means of the door opening apparatus of the household appliance by the user in order to allocate a sensor signal. This sensor signal can then be supplied to the control facility of the door opening apparatus in order to cause the door to open. It can also be provided that the door opening apparatus only assists the opening of the door by the user, in other words provides a force for opening the door that however in itself in general fails to cause the door to open.

The plunger, in particular the plunger head, does not need to be permanently mechanically fixedly connected to the door inner side or the door. The bracing abutment can, for example, be automatically released when the door is opened by a predetermined pivot angle or a pivot angle that can be predetermined relative to the closed state. As soon as the user closes the door, the plunger can, for example, be moved by means of the closing movement back into a starting position in that the door inner side presses against the plunger head and moves this plunger head along until the fully closed state of the door. However, it can also be provided that, after causing the door to open, the drive unit actively moves the plunger into a retracted position, and the plunger is only influenced using the bracing force by the door opening apparatus after the door is closed. It is thereby possible for the plunger head to be moved back towards the door inner side until it rests against the door inner side.

The door opening apparatus has the position sensor for detecting the at least one position of the plunger head. As a consequence, it is possible to achieve that for example at least the opened state and/or also the closed state of the door can be detected. There is then the possibility in certain circumstances in dependence upon the detected position to output a corresponding message. The position sensor can be configured so as to detect at least a single position of the plunger. This can be for example the closed state of the door. Furthermore, it is possible by means of the position sensor to also detect the opened state of the door. It can also be provided that more than only a single position of the plunger head is detected by means of the position sensor. In particular, naturally the positions of the plunger can be detected in the closed and in the opened state of the door.

The invention is further based, inter alia, on the idea that the plunger head can already rest against the door inner side in the closed state of the door. The door opening apparatus can thus not only be used to cause the door of the household appliance to open, but rather it is also possible to simultaneously use the door opening apparatus as a sensor, in particular for the opening state of the door, but also so as to detect a manual actuation by a user and/or the like, so that, inter alia, a door opening request of the user can also be detected. Compared to the prior art, it is thereby no longer necessary to provide a separate sensor unit for this purpose. This can be omitted entirely because the door opening apparatus itself also simultaneously provides the sensor functionality.

The invention achieves this, inter alia, by the fact that in the closed state of the door the plunger or its plunger head is braced against, or rests against, or touches the door inner side. It is thereby possible that the plunger does not need to perform a stroke until making contact with the door inner side. Therefore, inter alia, an actuation by the user, which can be manifested at least in a slight movement of the door, can also be detected by means of the plunger, wherein the door opening apparatus can detect by means of the position sensor the movement of the plunger that is consequently caused. This explains why the invention provides that the mechanical bracing unit influences the plunger using a force so that the plunger head is mechanically braced against the door inner side. Unlike in the prior art, it is therefore preferably provided in the case of the invention that during the closed state of the door a continuous mechanical contact occurs between the plunger head and the door inner side.

In this context, "door open" means that the door is no longer closed.

The electric machine can, for example, be configured as a single-phase or multi-phase AC machine, a stepper motor or also a DC machine. To cause the door to open, the electrical voltage is applied by the control unit to the stator winding of the electric machine or the stator of the electric machine. This produces a motor effect which is converted via the gearing mechanism into a translational force on the plunger, so that the plunger can be influenced using a force in the direction of the door inner side and which is suitable for causing the door to open. Since only a temporary bracing abutment of the plunger head against the door inner side is provided, it is then possible for the plunger to be moved only a small stroke in order to push the door open, so that the user can grip behind an edge of the door and thereby fully open the door. In this regard, the gearing mechanism is preferably configured in such a manner that it can not only convert a rotational movement of the rotor into a translational movement of the plunger, but rather is also capable of converting a translational movement of the plunger into a rotational movement of the rotor.

The plunger, in particular the plunger head, thus does not need to be permanently mechanically fixedly connected to the door inner side or the door. As soon as the user closes the door, the plunger can, for example, be moved by means of the closing movement back into a starting position in that the door inner side presses against the plunger head and moves this plunger head along until the fully closed state. However, it can also be provided that after causing the door to open by applying a further, different electrical voltage to the stator winding, the plunger is actively moved into a retracted position and only after closing the door is the force applied again by means of the mechanical bracing unit, so that the plunger head is moved towards the door inner side until the plunger head rests against the door inner side.

The plunger can have at least a round or an angular cross-sectional shape. It is preferred that the plunger is configured circular or rectangular. The cross-sectional shape of the plunger is preferably substantially constant over its axial extent. In the region of the first end, however, this can also be provided in a deviating manner. The plunger head can have the same cross-sectional shape as the plunger. However, the plunger head can also have a curved spherical shape. In terms of a cross-sectional area, the plunger head can be smaller or also larger than a cross-sectional area of the plunger in the longitudinal extent.

The electric machine is in general configured as a rotating or rotatable electric machine and is likewise extensively known in the prior art, so that as in the case of the household appliance, separate printed proof is not required in this respect. A rotating electric machine is an apparatus which converts electrical energy into mechanical energy, in particular into rotational energy, in a motor operation and/or mechanical energy into electrical energy in a generator operation. The movement is in general a rotational movement that is performed by a rotor of the rotating electric machine, the rotor being arranged rotatably relative to a stator of the rotating electric machine. In contrast to the rotor, the stator is in general arranged in a rotationally fixed manner, in other words a rotational movement is a rotational movement of the rotor relative to the stator. The rotor is arranged rotatably mounted relative to the stator, wherein an air gap is in general formed between the rotor and the stator.

In the intended operation, the stator and the rotor are linked by means of a magnetic flux, whereby in the motor operation the force effect or the torque is provided which drives the rotor in rotation relative to the stator. In the generator operation, mechanical energy that is supplied to the rotor in the form of a rotation in conjunction with a torque is converted into electrical energy. For this purpose, at least the stator has an electric winding through which an electric current flows, also called stator winding. The rotor can likewise have an electric winding as a rotor winding and/or one or more permanent magnets.

For the intended operation, the electrical voltage is applied to the stator winding in order to cause the door to open. Depending upon the construction of the electric machine, in particular its stator winding, a single-phase or also a multi-phase stator winding can be provided, for example, for the application of an alternating voltage, and a single-phase or multi-phase electrical alternating voltage is accordingly applied to the stator winding. A multi-phase alternating voltage in general has phase alternating voltages corresponding to the number of phases and the phase alternating voltages in general have approximately the same frequency and approximately the same amplitude, but are shifted with respect to one another in terms of their phase position. A very common multi-phase alternating voltage is, for example, a three-phase alternating voltage in which the phase voltages are each shifted in phase by 120° with respect to one another. Such an alternating voltage is also used, for example, in the public power supply network.

The control unit is preferably configured as an electronic hardware circuit and can have a program-controlled computer unit in order to realize the desired functionality. In particular, the control unit, in particular the hardware circuit, can have a DC/DC converter, an inverter and/or the like for applying the electrical voltage to the stator winding. Naturally, the control unit can also be formed only by the computer unit or also have a combination of a hardware circuit with the computer unit. For this reason however, it is also possible for the control unit to comprise only a hardware circuit. The control unit can also be at least partially included in a superordinate control unit of the household appliance. However, the control unit can also be provided as a separate component in the household appliance. In particular, the control unit is provided at least partially as part of the door opening apparatus.

In order to provide the sensor functionality, the door opening apparatus, for example the control unit, provides the position sensor. It is thereby possible to achieve that by means of the circuit arrangement the at least one position of the plunger can be detected in the absence of the application of the electrical voltage to the stator winding by the control unit. A sensor signal that is provided by the position sensor in relation to the at least one detected position can then be at least in part evaluated by the control unit in order to determine the opening state of the door. For this purpose, the position sensor can provide the sensor signal that is dependent upon the detected position of the plunger. The position sensor can be configured so as to detect one or more positions of the plunger. It is possible to predetermine or to adjust the at least one position that is to be detected. The position sensor can detect the at least one position that is to be detected for example in an optical, magnetic, capacitive and/or also mechanical manner. The position sensor can have a corresponding detecting unit for each position that is to be detected. It can however also be provided that a detecting unit is configured so as to detect more than only a single position. It is also possible to provide combinations thereof. The position sensor is preferably arranged in an integrated manner in a housing of the door opening apparatus. The position sensor can however also be arranged in part separately from the housing.

It is furthermore proposed that the position sensor is configured so as to detect the position of the plunger in the closed state of the door. As a consequence, it is possible to determine at least the closed state of the door. For the intended operation of the household appliance, the closed state of the door is frequently an important state. In the case of a household refrigeration appliance, it is consequently possible for example to monitor whether the temperature conditions can be achieved for objects that are stored in the interior space, such as for example food. It is also possible to determine whether the closed state of the door has been reliably achieved. Altogether, function of the household appliance can be improved.

Furthermore, it is proposed to detect the position of the plunger in the state of a maximum forward stroke of the plunger. This renders it possible to determine at least the opened state of the door. The opened state of the door can be displayed for example by means of a display unit. The maximum forward stroke of the plunger does not need to be configured for the purpose of pivoting the door into the fully opened position. It can be provided that the door is pivoted by means of the plunger only into a part-opened position in which the user can grip behind the door and pivot the door fully open. It is preferred that the bracing abutment and thus the maximum forward stroke is limited to a region that is dependent upon the part-opened position.

In accordance with one development, it is proposed that the plunger has a magnet for detecting the position of the plunger by the position sensor, and position sensor has a magnetic sensor. The magnet can be arranged on a region of an end of the plunger that is remote from the plunger head. The magnet can be arranged for example on the plunger in such a manner that the magnet provides a magnetic field in a transverse manner with respect to the longitudinal axis of the plunger. As a consequence, the magnetic sensor can effectively detect the magnetic field. It is possible to achieve a precise reliable determination of the position of the plunger. The magnet can be arranged on a surface of the plunger. The magnet can be configured as a single piece with the plunger. The magnet does not need to surround the plunger. The magnetic field sensor is preferably arranged in such a manner that it is capable of detecting the magnetic field that is provided by the magnet in the position of the plunger that is to be detected. Furthermore, it can also be provided that the magnetic field sensor is arranged in such a manner that it does not detect the magnetic field that is provided by the magnet in the position that is to be detected, in particular only then detects the magnetic field if the plunger is outside the position that is to be detected.

Furthermore, it is proposed that the magnetic sensor has an electrical coil. It is possible using the electrical coil to detect the magnetic field of the magnet in a cost-effective and effective manner. In dependence upon the detected magnetic field the coil can provide a sensor signal that can be evaluated by an evaluating unit that is connected to the coil, which can be included for example at least in part in the control unit, in order to determine the position of the plunger with little outlay.

Furthermore, it is proposed that the magnetic sensor has a reed switch. It is possible using the reed switch, which can be configured for example as a reed pill or the like, to achieve a particularly simple and cost-effective realization of the detection of the magnetic field. The use of a reed switch proves further advantageous in relation to an immunity to interference, in particular in relation to electromagnetic compatibility. The reed switch can be provided with a dedicated magnetic field orientation or also with additional magnetic field orientation, for example in that one or more metal cylinders are provided. A longitudinal axis of the at least one metal cylinder is preferably arranged in a transverse manner with respect to a longitudinal axis of the reed switch. It has been shown to be preferable if at least one metal cylinder is arranged on an end of the reed switch. The metal cylinder is electrically connected to the respective contact of the reed switch. The respective metal cylinder is preferably arranged centrally in relation to the corresponding contact of the reed switch. It is thereby possible to further improve, in particular to adjust, the sensitivity of the reed switch. The reed switch and/or the at least one metal cylinder can be arranged on a circuit board. They can however also be arranged at least in part in an opening of the circuit board and can be connected to one or more conductor tracks of the circuit board. A longitudinal extent of the at least one metal cylinder amounts to at least 50% of a longitudinal extent of the reed switch. A diameter of the at least one metal cylinder amounts to at least 50% of a diameter of the reed switch.

It is further proposed that the magnetic sensor has a Hall effect sensor. It is likewise possible to detect the magnetic field of the magnet using the Hall effect sensor. The Hall effect sensor is however also particularly suitable for being able to detect an intermediate position and/or a position region of the plunger. The Hall effect sensor can likewise be connected to the above-mentioned evaluating unit. The evaluating unit can be configured so as to determine the intermediate position and/or the position region of the plunger. In a simple manner, it is consequently possible for example to determine an opening state of the door in which the door is not fully closed, for example because the closing of the door is impeded by an object that protrudes at least in part into the access opening. The reliability can be further improved. Furthermore, the use of the Hall effect sensor renders it possible for an actuation of the door by the user to be better determined. It is thus possible to evaluate a characteristic in order to determine whether an unintended actuation by the user is present in which the door is not to be opened. Thus, the accuracy of the determination of the actuation by the user can be improved.

In accordance with one development, it is proposed that the bracing unit has a magnet for interacting with a magnetizable bracing region of the door inner side, wherein the magnet is arranged on the plunger head. It is thereby possible for the bracing unit to be realized in a particularly simple manner, because the plunger head can be braced against the door inner side due to the magnetic interaction, in particular in the closed state of the door. Furthermore, the temporary bracing abutment of the plunger head against the door inner side can also be achieved particularly easily in this way, because as the door is being opened by the user, the connection between the magnet or the plunger head and the magnetizable bracing region of the door can be released in a simple manner by applying an appropriate force. This allows the door to be swung wide open by the user without obstructing the access of the user through the access opening. As soon as the door is closed again by the user, the connection can be re-established in that the magnetizable bracing region is produced using the plunger head or its magnets via magnetic interaction, so that a bracing of the plunger head can be reliably achieved at least during the closed state of the door. This bracing unit furthermore has the advantage that it can be operated in a particularly reliable and continuous manner and can be particularly insensitive with respect to disruptive influences such as dirt, moisture and/or the like.

In accordance with one development, it is proposed that the bracing unit has a spring element for influencing the plunger using a force. The force that is applied by means of the spring element is preferably directed in the direction of the door inner side in the closed state of the door, so that the plunger head can be braced against the inner side of the door. The spring element can be configured, for example, as a disc spring, a leaf spring or a helical spring. As a helical spring, it is preferably configured in such a manner that it at least partially surrounds the plunger in the radial direction and is braced against a radial projection or collar of the plunger. On the opposite side, the spring element can be braced against the housing.

In accordance with one development, it is proposed that the door opening apparatus has a stop for limiting a maximum extended position of the plunger head. The stop can be provided for example on the housing side or also on the plunger side. The stop can interact with a projection or a recess of the plunger. By limiting the maximum extended position of the plunger, it can be achieved that the plunger in the maximum extended position in an open state of the door impedes the user as little as possible in accessing the interior of the body. In particular, it is consequently possible to improve the ergonomics and safety.

It is furthermore proposed that the stator winding is configured for an operation at a multi-phase alternating voltage as an electrical voltage in that the stator winding has at least one respective phase winding for each of the phases of the alternating voltage and the at least two measuring connectors are connected to precisely one of the phase windings or to two different phase windings. The phase windings can be interconnected in a star connection or n-corner connection in the case of three phase windings in a delta connection. It is thereby possible to achieve a reliable detection of the induced voltage with little outlay.

In accordance with one development, it is proposed that the door opening apparatus is configured in the closed state of the door so as to be temporarily operated in a passive state and to switch into an active state in dependence upon a detection of an actuation by a user. Due to the active state and the passive state, it is possible to operate the door opening apparatus in an energy saving mode in which energy consumption is reduced. The energy saving mode can be allocated to the passive state. In particular, it is proposed that the control unit is configured so as to only apply the electrical voltage to the stator winding in the active state. It is consequently only necessary to cause an opening of the door in the active state. In the passive state, the control unit can be at least in part deactivated with the result that for example the electrical voltage cannot be applied to the stator winding. The inverter can thus be fully deactivated using an associated control unit. It is therefore not possible to cause an opening of the door in the passive state. This can also improve reliability because the risk of opening the door on account of an interference signal can be reduced.

In relation to the household appliance, it is further proposed that a door inner side of the door in a door region, which lies opposite the door opening apparatus in the closed state of the door, has at least in part a magnetizable material as a magnetizable bracing region. The magnetizable material can feature for example iron, cobalt, nickel or the like. Naturally, alloys of these that have ferromagnetic properties can also be provided. The magnetizable material can form the entire door inner side. It is however also possible to provide that the magnetizable material is only provided in the magnetizable bracing region. In this manner, it is possible to achieve a simple use with a door opening apparatus and the bracing unit of the door opening apparatus has a magnet.

It is further proposed that the magnetizable material is formed at least in part by a ferromagnetic plate that can be at least in part adjusted with regard to its position and orientation. The ferromagnetic plate can be arranged as a separate component as a magnetizable bracing region on the door inner side. For example, the ferromagnetic plate can be connected by means of screws, adhesives, clamps or the like to the door inner side. It is preferred that the ferromagnetic plate however can be at least in part adjusted with the result that for example a position with respect to a surface of the door inner side can be changed in that the ferromagnetic plate can be adjusted for example with regard to a protrusion with respect to the door inner side or the like. It can also be provided that the ferromagnetic plate can be pivoted or twisted with respect to a surface of the door inner side. As a consequence, the function of the invention can be further improved.

In relation to the household appliance, it is further proposed that the axis is a vertical axis and the first region is a vertical edge of the access opening, wherein the door opening apparatus is arranged at least above or below the access opening on the body. As a consequence, it is possible to achieve a reliable construction of the household appliance that can continuously ensure a reliable function of the door opening apparatus. Altogether, the function of the household appliance can thereby be further improved.

The advantages and effects that are disclosed for the method in accordance with the invention also apply equally for the apparatuses in accordance with the invention and the household appliance that is equipped with the apparatuses in accordance with the invention and vice versa. In particular, apparatus features can therefore also be worded as method features and vice versa. Furthermore, features of different aspects can be almost arbitrarily combined with one another in order to arrive at further embodiments within the scope of the inventive idea.

Further features of the invention are evident in the claims, the figures and the description of the figures. The features and feature combinations that are mentioned above in the description and also the features and feature combinations that are mentioned below in the description of the figures and/or that are illustrated in the figures alone can not only be used in the respectively disclosed combination but rather can also be used in other combinations without departing the scope of the invention. There are consequently also embodiments of the invention that are to be regarded as included and disclosed, which are not explicitly illustrated and explained in the figures, however are disclosed and can be generated by separate feature combinations in the explained embodiments. There are also embodiments and feature combinations that are to be regarded as disclosed, which consequently do not have all the features of an originally worded independent claim. There are furthermore embodiments and feature combinations, in particular due to the embodiments presented above that are to be regarded as disclosed, which go beyond or deviate from the feature combinations that are presented in the references in the claims.

Other features which are considered as characteristic for the invention are set forth in the appended claims.

Although the invention is illustrated and described herein as embodied in a method for determining an actuation of a door of a household appliance by a user, an apparatus for this purpose and also a household appliance having the apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
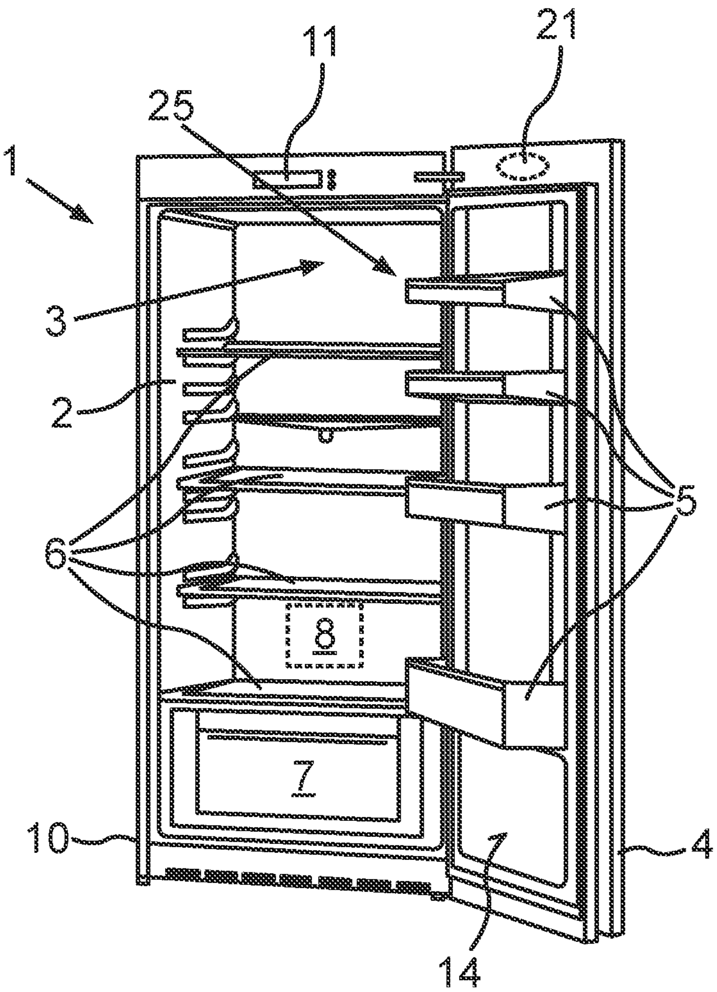
FIG. 1 is a schematic perspective view of a household refrigeration appliance.

Referring now to the figures of the drawings in detail and first, particularly to FIG. 1 thereof, there is shown a schematic perspective view of a household refrigeration appliance 1 that contains a thermally insulated body 10 having an interior container 2 that delimits an interior space 3 that can be cooled. The interior space 3 that can be cooled is provided so as to store food that is not shown further.

The household refrigeration appliance 1 in the present exemplary embodiment has a pivotable door 4 for closing the interior space 3 that can be cooled. The door 4 is pivotably mounted in relation to an axis that extends vertically. In the case of an opened door 4, as is shown in FIG. 1, the interior space 3 that can be cooled is accessible from outside. Multiple door trays 5 for storing food are arranged on the side that is oriented in the direction of the interior space 3 that can be cooled. Multiple shelves 6 for storing food are arranged in the interior space 3 that can be cooled and a drawer 7 is arranged in the lower region of the interior space 3 that can be cooled and food can likewise be stored in the drawer. The household refrigeration appliance 1 contains a coolant circuit that is not shown for cooling the interior space 3 that can be cooled.

The household refrigeration appliance 1 further has an electronic control facility 8 that is configured so as to operate the coolant circuit in such a manner that the interior space 3 that can be cooled at least approximately achieves a predetermined desired temperature or a desired temperature that can be predetermined. The electronic control facility 8 is configured in such a manner that it detects a prevailing temperature of the interior space 3 by means of a temperature sensor that is not shown, compares with the predetermined desired temperature or desired temperature that can be predetermined and outputs at least a control signal for the coolant circuit in dependence upon the comparison.

The door 4 closes the access opening 25 of the body 10 of the household refrigeration appliance 1 to the interior space 3 of the household refrigeration appliance 1 in the present embodiment preferably inter alia by virtue of the fact that at least one door inner side 14 of the door 4 braces against an elastic seal that is arranged on the body 10 and circumferentially around the access opening, or an elastic seal that is arranged on the door inner side 14 braces circumferentially against a region of an edge of the access opening 25.

Furthermore, the household refrigeration appliance 1 has a door opening apparatus 11. This is arranged in the present embodiment approximately centrally above the access opening 25 of the body 10 and a user can access the interior space 3 via the access opening in the case of the opened door 4. The door 4 in the present case is configured without a handle for manual handleless actuation by the user. The invention is however not limited to this.

If the user wishes to be able to access the interior space 3 of the household refrigeration appliance 1, they thus press as an actuation against an outer side of the door 4, which is not labelled, in the closed state. The door opening apparatus 11 provides a corresponding sensor functionality that is further explained below with the result that the door opening apparatus 11 can detect this manual actuation by the user. Owing to the detection, a drive functionality, which is further explained below, is then activated with the result that in the closed state the door inner side 14 of the door 4 is acted upon and the door 4 is brought at least in part into an opened state. The user can then grip behind the door 4 that is at least opened by a gap and swing the door 4 fully open. The user consequently then has free access to the interior space 3 via the access opening 25. After terminating the access, the user can swing the door 4 by a further manual actuation back into the closed state. In this embodiment, the actuation is not assisted.

The door 4 is used to close the access opening 25, wherein the door 4 in a first region of an edge of the access opening 25 is arranged about or hinged on the body 10 so that the door can pivot about a vertical axis. In the present case, the hinge arrangement is provided on a right-hand side of the body 10, as is shown in FIG. 1.

Figure 2:
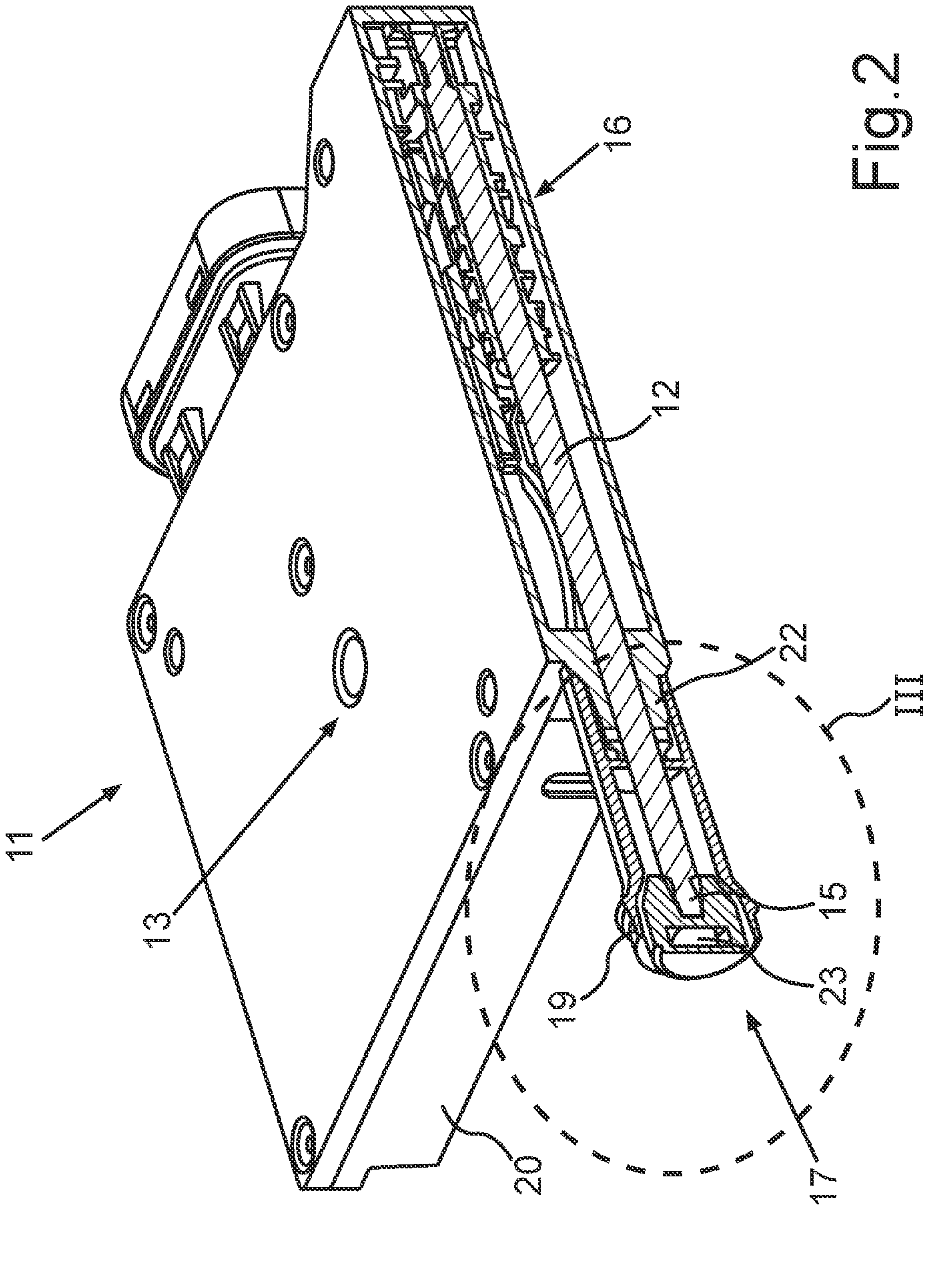
FIG. 2 is a schematic perspective view of a door opening apparatus for the household refrigeration appliance in accordance with FIG. 1 having an apparatus for determining an actuation of a door of the household refrigeration appliance by a user.
Figure 8:
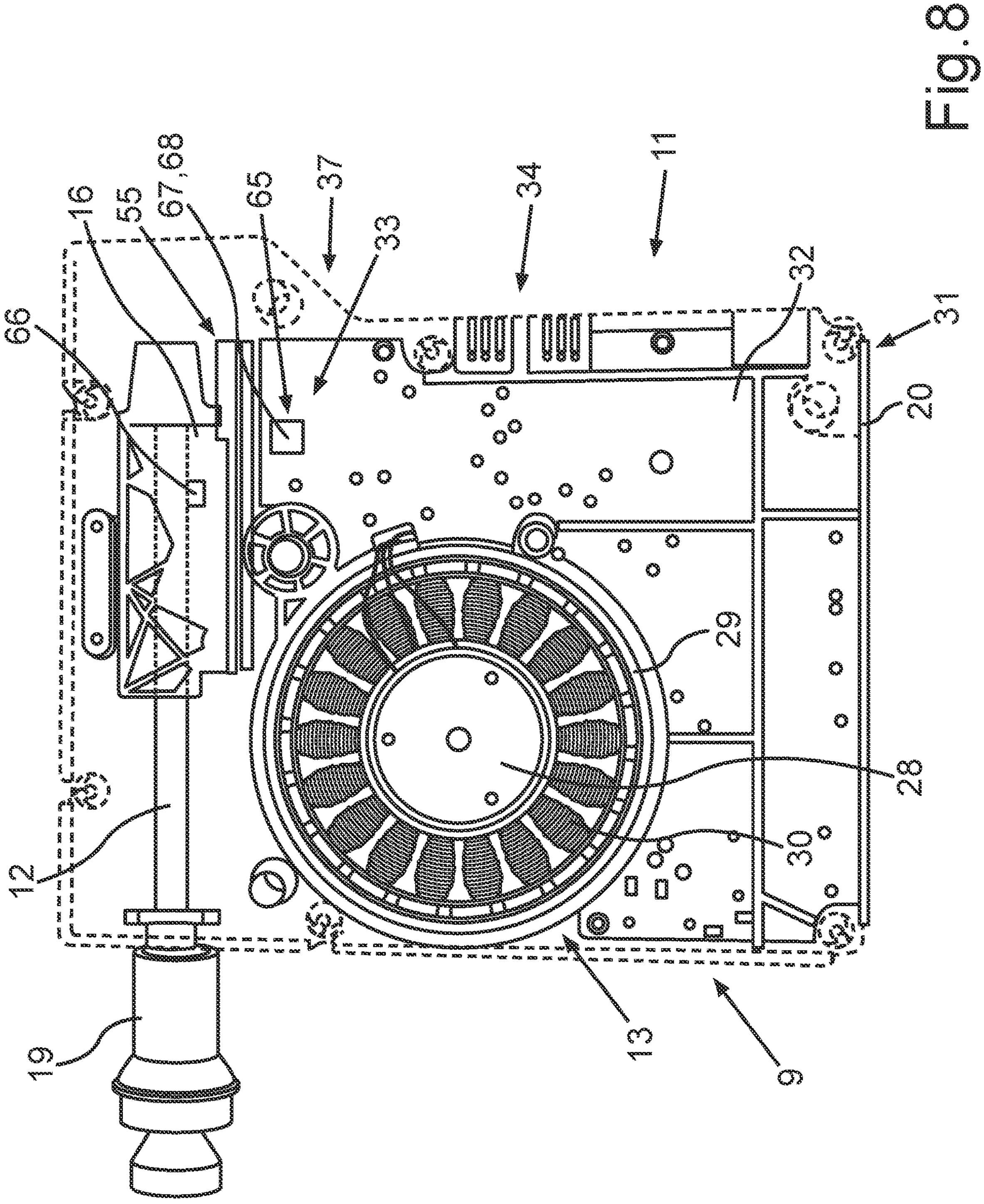
FIG. 8 is a schematic side view of the door opening apparatus in accordance with FIG. 2.
Figure 9:
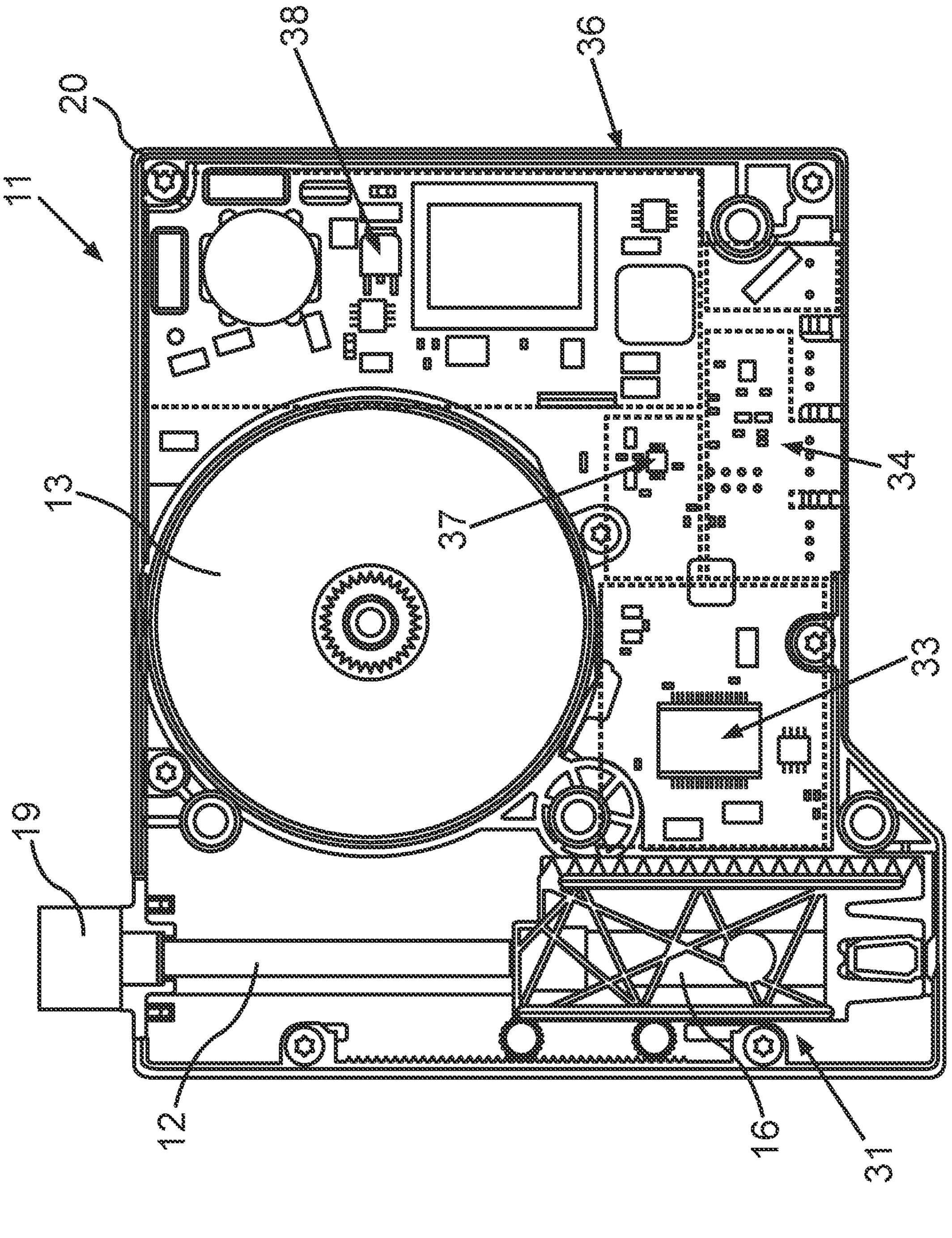
FIG. 9 is a schematic plan view of a rear view of the door opening apparatus in accordance with FIG. 2.
Figure 12:
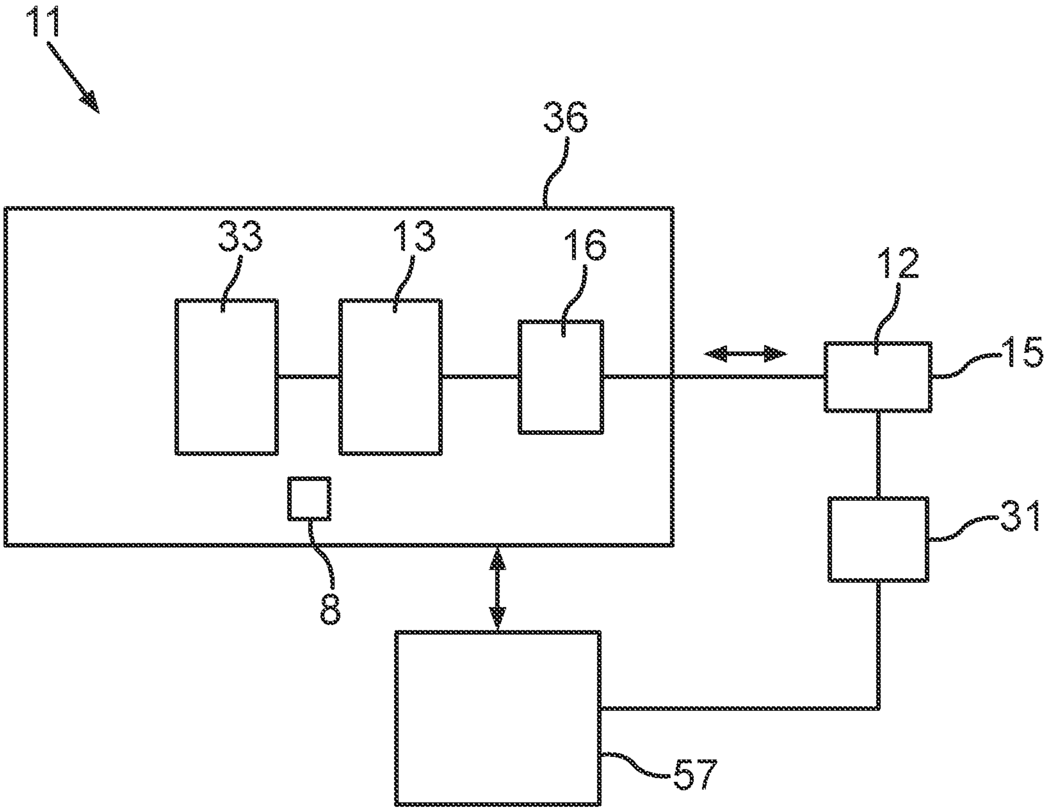
FIG. 12 is a schematic block diagram of the door opening apparatus in accordance with FIG. 2.

FIG. 2 shows a schematic perspective view of the door opening apparatus 11 for the household refrigeration appliance 1 in accordance with FIG. 1 in a first embodiment. FIG. 8 shows a schematic side view of the door opening apparatus 11. FIG. 9 shows a schematic opposite-lying side view in relation to FIG. 8 of the door opening apparatus 11. FIG. 12 shows a schematic block diagram of the door opening apparatus 11. It is apparent that the door opening apparatus 11 has a housing 20 in which the corresponding elements and units of the door opening apparatus 11 are arranged. In a front region in FIG. 2, which is further explained below, the door opening apparatus 11 is shown in a sectional view.

It is further apparent that a plunger 12 of the door opening apparatus 11 is arranged in the sectioned region and the plunger in the case of the provided installation position of the door opening apparatus 11 is arranged in relation to a longitudinal axis 18 (FIG. 3) in a transverse manner with respect to the door inner side 14 in the closed state of the door 4 and is axially movable (FIGS. 4 to 7). The plunger 12 on the door side has a first plunger end with a plunger head 15. Further, a drive unit 36 having a rotating electric machine 13 is arranged within the housing 20 and the rotating electric machine has a rotor 29 that is rotatably arranged relative to a stator 28. The drive functionality can be provided by means of the drive unit 36. The rotating electric machine 13 in the present case is configured as an exterior rotor (FIG. 8). In alternative embodiments, it is however also possible to provide a rotating electric machine that is configured as an internal rotor.

The rotor 29 and the plunger 12 are mechanically coupled by means of a gearing mechanism 16 of the drive unit 36 in order to be able to provide a mechanical coupling of the rotor 29, in terms of drive, to the plunger 12. Further, a stator winding 30 of the stator 28 is electrically coupled to an inverter 33 of the drive unit 36. The stator winding 30 in the present case is configured as a three-phase stator winding with the result that for the realization of the motor function it is possible to influence the stator winding using a three phase alternating voltage. As is apparent in FIG. 8, the inverter 33 is arranged on a circuit board 32 in the housing 20 as an electronic hardware circuit. Consequently, in the intended operation it is possible to apply a suitable electrical voltage to the stator winding 30.

As is apparent in FIGS. 8 and 9, the door opening apparatus 11 has a control unit 36 that is arranged at least in part on the circuit board 32 in the housing 20 as an electronic hardware circuit. In this sense, the terms control unit and drive unit are to be understood as synonymous within the scope of the present disclosure. The control unit 36 has the inverter 33 and the stator winding 30 is connected to the inverter. Consequently, in the intended operation it is possible to apply a suitable electrical voltage, which here is a three phase alternating voltage, to the stator winding 30 in order to cause the door 4 to open. The control unit 36 further has a power supply unit 38 that is used to supply the control unit 36 and also the further units that are described below. In this regard, the power supply unit 38 can be coupled to a public power supply network that is not shown in the figure.

A control unit 9 of the door opening apparatus 11 is further arranged on the circuit board 32 (FIG. 8) and the control unit provides control functions inter alia for the inverter 33, a communication with the control facility 8 and also an apparatus 57 for determining an actuation of the door 4 of the household appliance 1 by a user (FIG. 12). The control unit 9 is coupled to the drive unit 36.

Furthermore, a position sensor 31 is arranged on the circuit board 32 as a sensor unit according to a type of electronic hardware circuit by means of which an axial position of the plunger 12 can be detected. For this purpose, a magnet can be arranged on the plunger 12 and the position of the magnet can be detected using a Hall effect sensor element or a reed pill.

The circuit board 32 further has an interface 34 that can be coupled, in terms of communication, signaling and energy, to the control facility 8.

The inverter 33 is configured so as to apply an electrical voltage to the stator winding 30 so as to cause the door 4 to open during a temporary bracing abutment of the plunger head 15 against the door inner side 14. The application of the electrical voltage leads to the fact that the electric machine 13 moves the plunger 12 in a motor operation via the gearing mechanism 16 in the direction of the door inner side 14 and consequently causes the door 4 to open. The housing 20 can be fastened to the body 10 of the household refrigeration appliance 1 as explained with the aid of FIGS. 4 to 7.

The door opening apparatus 11 has a mechanical bracing unit 17. The bracing unit 17 is configured so as to influence the plunger 12 using a force so as to mechanically brace the plunger head 15 against the door inner side 14 at least in the closed state of the door 4 and at least in the absence of the application of the electrical voltage to the stator winding 30. In the closed state of the door 4, the plunger head 15 consequently rests against the door inner side 14 and touches or contacts this door inner side. The mechanical bracing unit 17 can preferably be part of apparatus 57 (FIG. 12) for determining an actuation of the door 4 of the household appliance 1 by a user.

The plunger 12 is at least in part arranged in an axially movable manner in a sleeve 19 that is made from an elastic plastic and that is closed on the head side. The sleeve 19 is detachably connected on an end that lies opposite a head-side end region to a housing flange 22 of the housing 20. The plunger 12 is thereby essentially arranged in a fully protected manner. The sleeve 19 does not need to be formed entirely from the elastic material. On the contrary, it suffices if the head-side end region of the sleeve 19 is accordingly elastic with the result that a movement of the plunger 12 or the plunger head 15 is rendered possible.

In the present embodiment, it is further provided that the bracing unit 17 has a magnet 23 for interacting with a magnetizable bracing region 21 of the door inner side 14, wherein the magnet 23 is arranged on the plunger head 15 (FIG. 2). It is consequently possible to achieve that a bracing or touching or contacting of the door inner side 14 can already be rendered possible owing to the magnetic force effect, at least if the door 4 is in the closed state.

Figure 3:
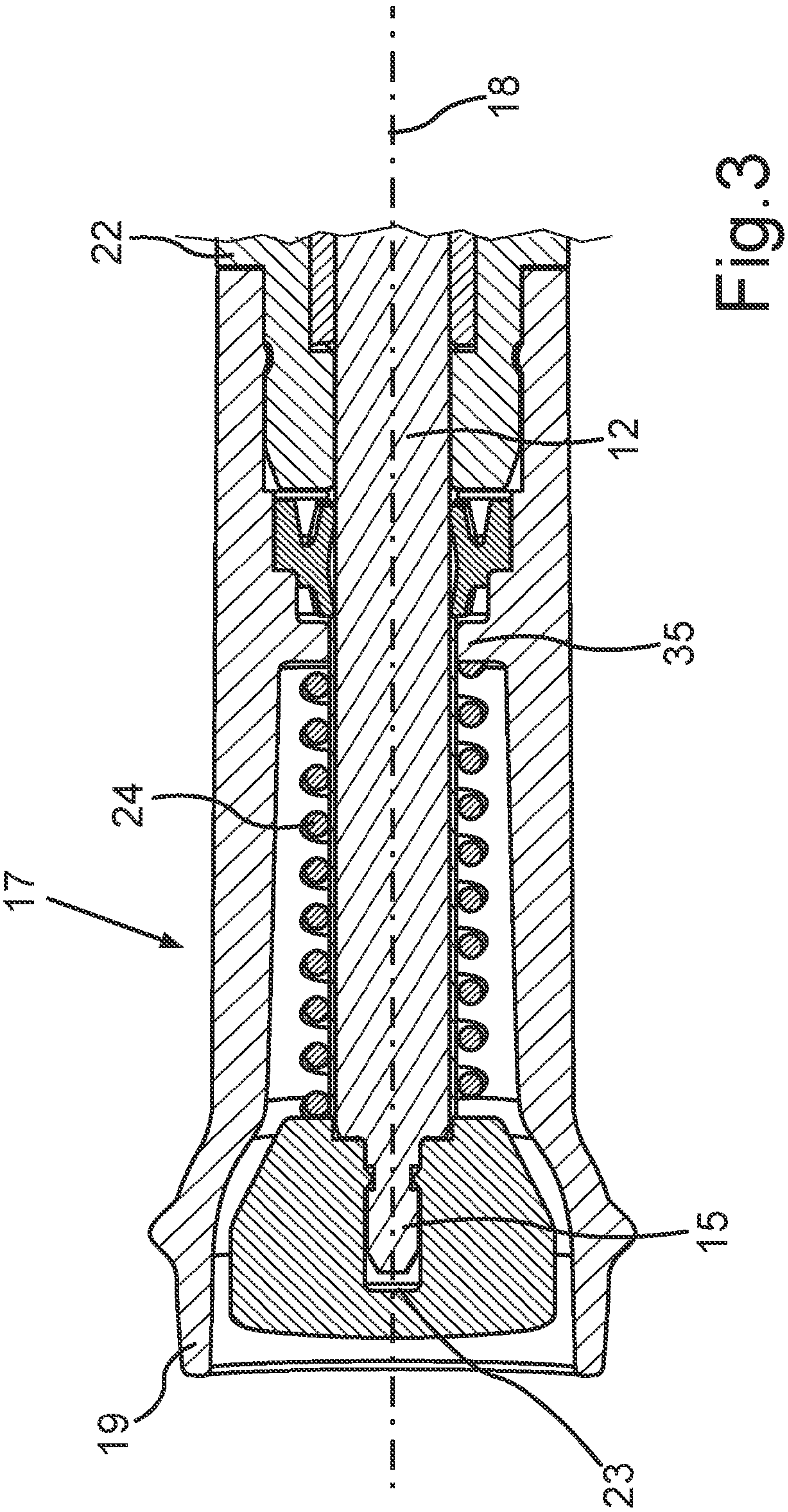
FIG. 3 is an enlarged schematic sectional view of a region III shown in FIG. 2.

Furthermore, in the present case it is provided that the bracing unit 17 in addition has a helical spring 24 as a spring element that is likewise used to influence the plunger 12 using the force (FIGS. 2, 3). If required, it can however be provided that the bracing unit 17 only has one of the elements that are explained above.

The helical spring 24 in the present case is arranged within the sleeve 19 and namely concentrically in relation to the longitudinal axis 18 of the plunger 12. The plunger 12 penetrates the helical spring 24 that is braced on its side against an end on a stop 35, which is facing the housing. An opposite-lying end of the helical spring 24 is connected to the plunger 12 in the region of the first plunger end or the plunger head 15. It is thereby possible to achieve and where applicable also adjust a desired force effect. It is simultaneously possible to achieve that the helical spring 24 is also entirely surrounded by the sleeve 19 with the result that the helical spring 24 can likewise be protected to a great extent against external influences. This is also apparent in FIG. 3 which shows a schematically enlarged sectional view of a region III shown in FIG. 2. The bracing unit 17 influences the plunger 12 in an opening direction of the door 4 using a bracing force that is smaller than a force for opening the door 4.

It is not shown in the figures that the door opening apparatus 11 depending upon the construction can also have a stop for limiting a maximum extended position of the plunger head 15. It is thereby possible to achieve that the plunger 12, in the extended state in which the door 4 has been caused to open, protrudes as little as possible into a region in which the user could reside. It is thereby possible to increase safety.

Likewise, in the figures it is not shown that the control unit 9 is configured so as to provide the above-mentioned sensor functionality. For this purpose, the control unit 9 is coupled, in terms of signaling, to the apparatus 57 for determining an actuation of the door 4 of the household refrigeration appliance 1 by a user. The apparatus 57 for determining an actuation of the door 4 of the household refrigeration appliance 1 by a user is furthermore coupled, in terms of signaling, to the position sensor 31. It is however not necessary to provide the position sensor 31. The position sensor can additionally be used so as to determine the position of the plunger 12, in particular if the electrical voltage is applied to the stator winding 30.

The apparatus 57 is configured so as to detect an electrical voltage that is induced in the stator winding 30 in the absence of the application of the electrical voltage to the stator winding 30 and so as to allocate a sensor signal to the detected electrical voltage. The apparatus 57 for this purpose is coupled, in terms of signaling, to the inverter 33 and can detect whether the electrical voltage is applied to the stator winding 30 by the inverter 33. The apparatus 57 is configured so as to compare a sensor signal that is allocated to the detected electrical voltage with a comparison value that can be predetermined and in dependence upon the comparison so as to determine a manual actuation to open the door 4 by the user. Depending upon the construction, this can also be realized simultaneously by the sensor unit 31. The door opening apparatus 11 can consequently simultaneously also be used as a sensor unit so as to determine the manual actuation by the user. The further function of the apparatus 57 is explained below in addition with the aid of FIG. 11.

FIG. 1 further shows that the door inner side 14 in a door region, which lies opposite the door opening apparatus 11 in the closed state, has a magnetizable material as a magnetizable bracing region 21. The magnetizable bracing region 21 in the present case is formed by a ferromagnetic plate that can be at least in part adjusted with regard to its position and orientation. The orientation of the ferromagnetic plate can thereby be adjusted as required with the result that it is possible to achieve as beneficial an effect as possible of the door opening apparatus 11. For example, it can be provided that the ferromagnetic plate can be adjusted with regard to the position on the door inner side 14. This can also comprise that a surface of the ferromagnetic plate deviates from a surface of the door inner side 14. Furthermore, it is possible to provide pivoting, twisting or the like provided that this is constructively expedient.

Figure 4:
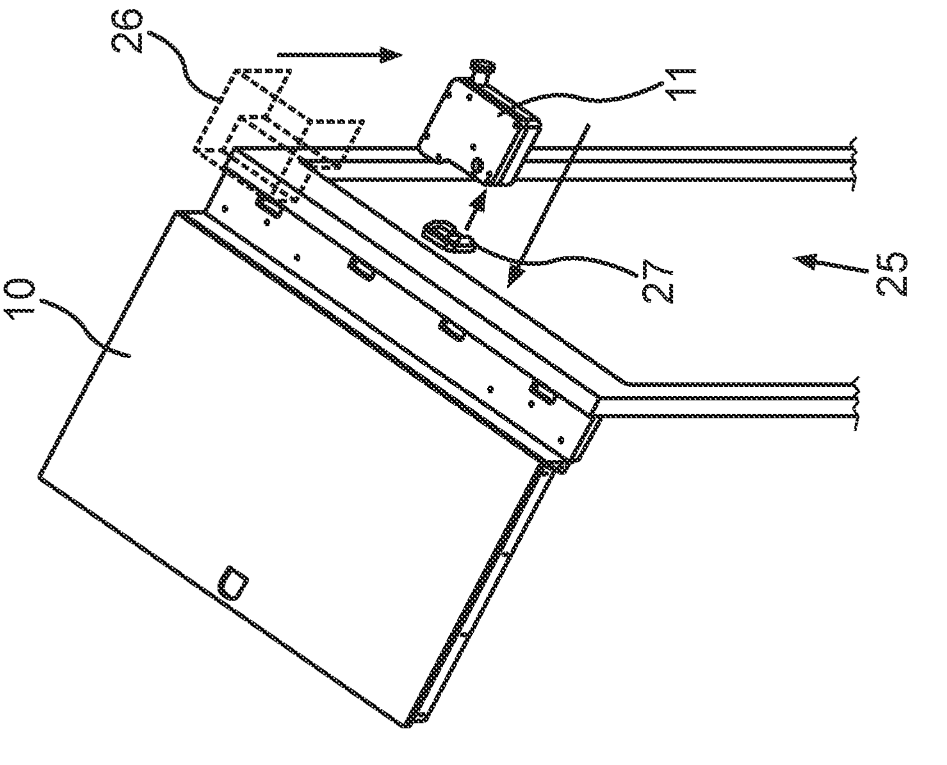
FIG. 4 is an exploded, perspective view of a front-side section of the household refrigeration appliance in accordance with FIG. 1 in which in addition a holding element and connecting unit is provided so as to connect the door opening apparatus to a body of the household refrigeration appliance above an access opening of the household refrigeration appliance.

FIG. 4 shows a schematic perspective exploded view of a front-side section of the household refrigeration appliance 1 in accordance with FIG. 1 in which the door opening apparatus 11 is to be arranged centrally above the access opening 25. It is apparent that in order to connect the door opening apparatus 11 to the body 10 a connecting unit 26 is provided that in the present case is formed from a retaining plate. A holding element 27 is further provided with which the door opening apparatus 11 can be fixed on the body 10 in the desired orientation with the result that the longitudinal axis 18 is transverse with respect to the door inner side 14 in the closed state of the door 4.

Figure 5:
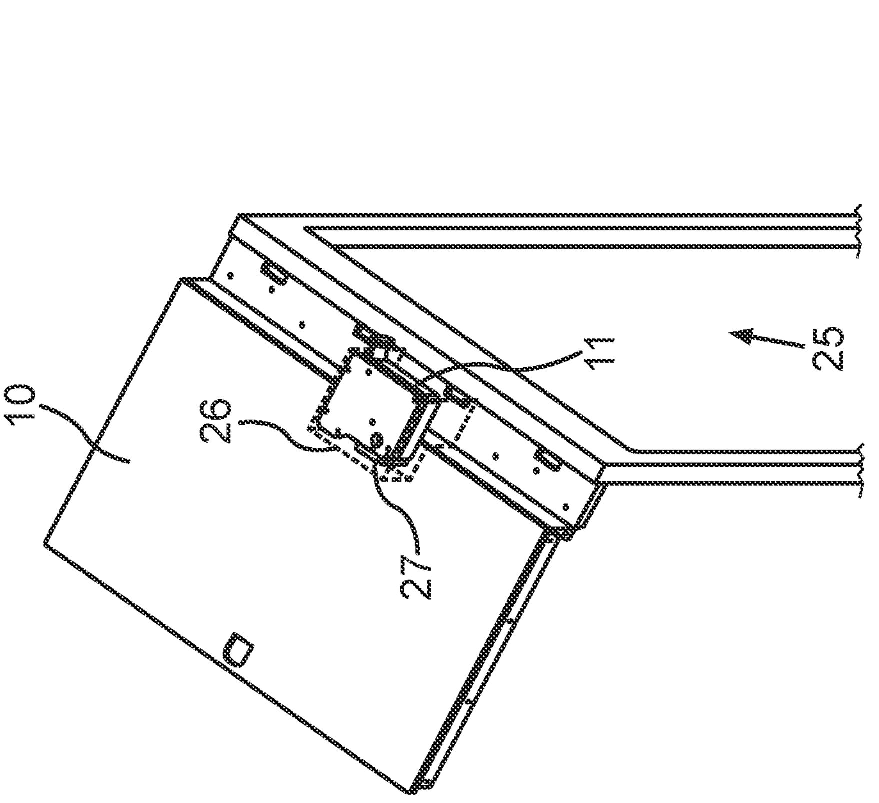
FIG. 5 is a schematic perspective view as in FIG. 4 of the door opening apparatus that is arranged on the body of the household refrigeration appliance.

The connecting unit 26 and also the holding element 27 are used so as to produce a reliable connection of the door opening apparatus 11 to the body 10 as is shown in the schematic representation in accordance with FIG. 5 in which the door opening apparatus 11 is fixedly arranged on the body 10 of the household refrigeration appliance 1.

Figure 7:
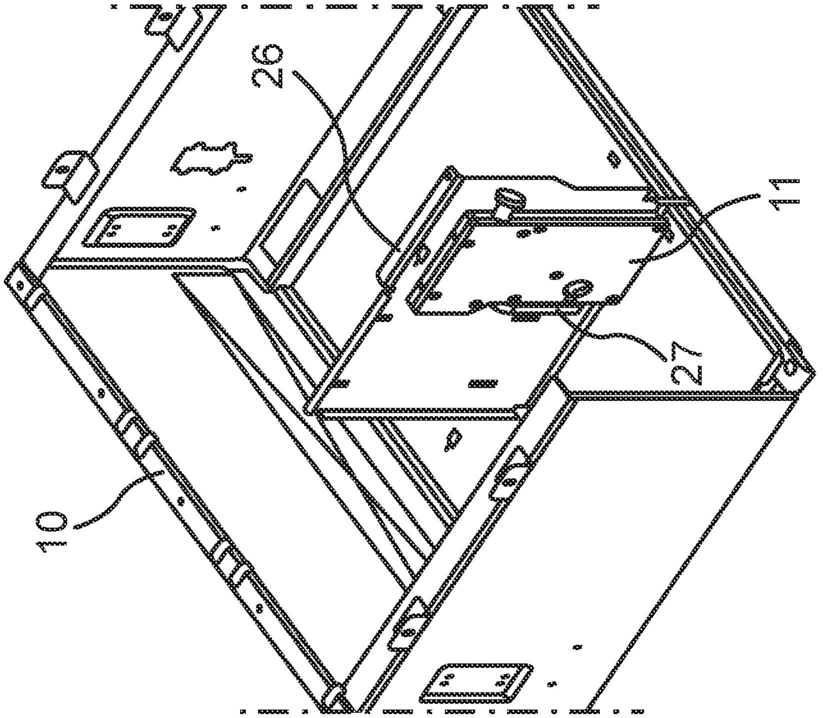
FIG. 7 is a perspective view as in FIG. 6 of the door opening apparatus that is arranged on the body of the household refrigeration appliance.
Figure 6:
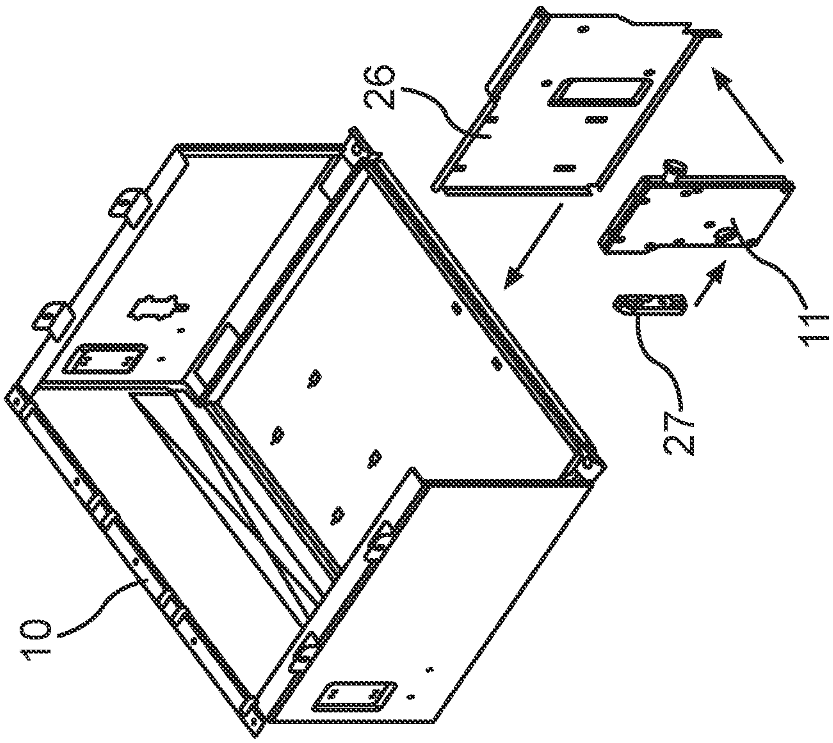
FIG. 6 is an exploded, perspective view as in FIG. 4 of the arrangement of the door opening apparatus below an access opening of the household refrigeration appliance.

FIGS. 6 and 7 show representations like FIGS. 4 and 5, wherein in the case of this embodiment the door opening apparatus 11 is arranged approximately centrally below the access opening 25 and namely in a region in which further components of the household refrigeration appliance 1 can also be arranged, which relate for example to the cooling circuit. In this respect, reference is made in addition to the statements made with regard to FIGS. 4 and 5.

The selected embodiment, to arrange the door opening apparatus 11 centrally in relation to the access opening 25, has the advantage that the door 4 ensures a reliable functionality independent of its stop on the left-hand side or on the right-hand side of the body 10. It is thus possible in the case of this embodiment to retrospectively select or to change the stop of the door 4 on the body 10.

Figure 11:
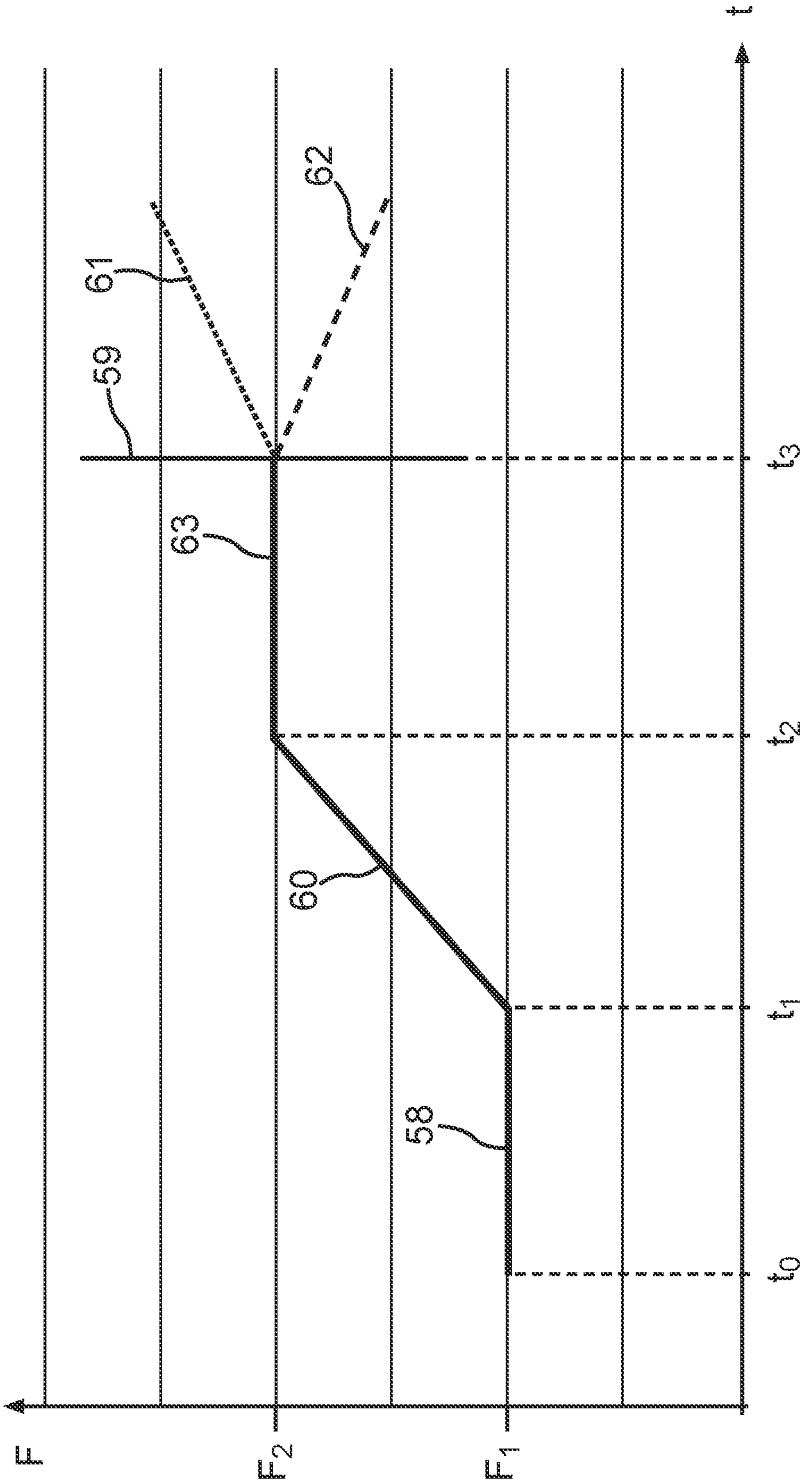
FIG. 11 is a graph showing a temporal force curve for determining the opening of the door for the door opening apparatus in accordance with FIG. 2.

FIG. 11 shows a schematic diagram of a time/force diagram. An abscissa is allocated to the time and an ordinate is allocated to the force. FIG. 11 shows the force that is exerted by means of the drive unit 36 at least in part assisted by the bracing unit 17 on the plunger 12. The method sequence that is shown in FIG. 11 starts at the point in time t0 at which the door 4 is pivoted or has been pivoted by the user into the closed state. While the door 4 is opening, the plunger 12 has been moved using the drive unit 36 beforehand into a fully retracted position in which the plunger head 15 would not be braced against the door inner side 14 of the door 4 if the door 4 were in the closed state. The drive unit 36 now acts upon the plunger 12 using a first force F1 in accordance with the graph 58 and the force is comparatively small. Using the force F1 the plunger 12 can perform a forward stroke in the direction of the door inner side 14. Since the door 4 is in the closed state, at the point in time t1 the contact of the plunger head 15 on the door inner side 14 is achieved with the result that the plunger head 15 can brace against the door inner side 14.

The drive unit 36 now slowly increases the force on the plunger 12 in accordance with a graph 60 in FIG. 11 to a value F2 that is achieved at a point in time t2. Using this force F2 the plunger head 15 braces against the door inner side 14 after the point in time t2. This force F2 is held in accordance with a graph 63 in FIG. 11 and acts continuously in the closed state of the door 4. The drive unit 36 can provide this force using the bracing unit 17 as an energy store, for example a spring mechanism or the like that for example the gearing mechanism can comprise.

A graph 59 labels a point in time t3 at which the user actuates the door 4 in that they press for example using a hand against a location on the door 4. The user pressing against the door 4 owing to the construction and dynamic effects leads to the fact that the door 4 performs a torsional movement. Depending upon at which location the user presses against the door in relation to the position of the plunger 12 the movement either causes a return stroke, which leads to an increase in force in accordance with a graph 61, because the pressure that the user has applied acts in addition to the force that is caused by the drive unit 36, or a forward stroke that leads to a decrease in force in accordance with a graph 62.

Both the return stroke as well as the forward stroke lead to an induced voltage in the stator winding 30. This can be detected and evaluated by the apparatus 57 in that a corresponding sensor signal is allocated to the induced voltage.

If the pressure site at which the user exerts pressure onto the door 4 is remote from the position of the plunger 12, on account of the torsion of the door 4 in accordance with the graph 62 a drop in force occurs which leads to the forward stroke of the plunger 12. The sensor signals that are detected in this manner are compared with corresponding comparison values, which can be realized by the apparatus 57. In the present case, a forward stroke comparison value and a return stroke comparison value are provided. As soon as the value falls below the forward stroke comparison value or the value exceeds the return stroke comparison value, the actuation by the user is determined in dependence upon this comparison and a corresponding signal is output to the door opening apparatus 11, in particular the control unit 9. The door opening apparatus 11 can then—as explained above—realize the corresponding opening function of the door 4.

It is thus possible due to the invention to simultaneously equip the door opening apparatus 11 with a sensor functionality with the result that a separate sensor unit is no longer required in contrast to the prior art. The reliability can simultaneously be improved.

As already explained with regard to FIG. 2, the rotor 29 and the plunger 12 are mechanically coupled by means of a gearing mechanism 16 in order to be able to provide a mechanical coupling of the rotor 29, in terms of drive, to the plunger 12. Further, the stator winding 30 of the stator 28 is electrically coupled to the control facility 8. The stator winding 30 in the present case is configured as a three-phase stator winding with the result that for the realization of the motor function it is possible to influence the stator winding using a three phase alternating voltage. As is apparent in FIG. 8, the door opening apparatus 11 has the control unit 36 that is provided by the drive unit 36. In this sense, the terms control unit and drive unit are to be understood as synonymous within the scope of the present disclosure. The control unit 36 is at least in part arranged on the circuit board 32 in the housing 20 as an electronic hardware circuit. The control unit 36 has the inverter 33 and the stator winding 30 is connected to the inverter. Consequently, in the intended operation it is possible to apply a suitable electrical voltage, which here is a three-phase alternating voltage, to the stator winding 30 in order to open the door 4.

The control unit 36 is configured to apply an electrical voltage to the stator winding 30 so as to cause the door 4 to open during a temporary bracing abutment of the plunger head 15 against the door inner side 14. The application of the electrical voltage leads to the fact that the electric machine 13 moves the plunger 12 in a motor operation via the gearing mechanism 16 in the direction of the door inner side 14 and consequently causes the door 4 to open. The housing 20 can be fastened to the body 10 of the household refrigeration appliance 1 as explained with the aid of FIGS. 4 to 7.

In order to be able to achieve a sensor functionality by means of the door opening apparatus 11, in the present case it is provided that the door opening apparatus 11 has the mechanical bracing unit 17. The bracing unit 17 is configured to influence the plunger 12 using a force so as to mechanically brace the plunger head 15 against the door inner side 14 at least in the closed state of the door 4 and at least in the absence of the application of the electrical voltage to the stator winding 30. In the closed state of the door 4, the plunger head 15 consequently rests against the door inner side 14 and touches or contacts this door inner side.

Figure 10:
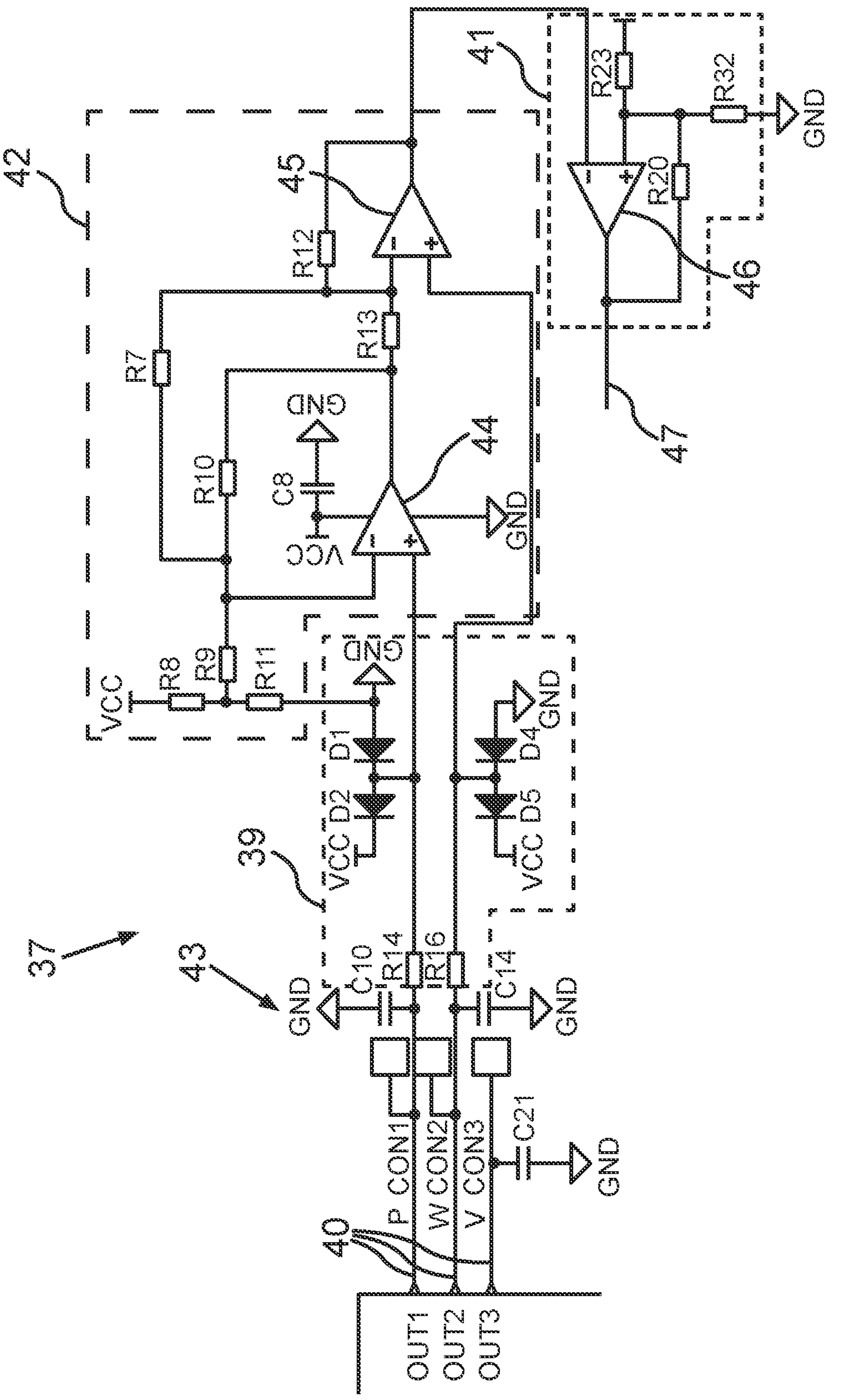
FIG. 10 is a schematic circuit diagram of a section of a circuit arrangement of the door opening apparatus in accordance with FIG. 2.

Further, it is provided that the control unit 36 has a circuit arrangement 37, in order to realize the sensor functionality of the door opening apparatus 11, and the circuit arrangement is electrically coupled to the stator winding 30 so as to detect an induced voltage of the stator winding 30 in the absence of the application of the electrical voltage to the stator winding 30. The circuit arrangement 37 is shown as a schematic circuit diagram in FIG. 10.

The stator winding 30 is configured for an operation on a three-phase alternating voltage as an electrical voltage in that the stator winding has a respective phase winding for each of the three phases of the alternating voltage. The three measuring connectors 40 are in each case connected to precisely one of the phase windings. For the evaluation by the circuit arrangement 37 however only the induced voltage between two of the measuring connectors 40 is drawn upon.

Further, the circuit arrangement 37 has a filter unit 43 for filtering the induced voltage that is detected between the two measuring connectors 40. In the present case, for this purpose in each case a capacitor C10, C14 is provided. As a consequence, it is possible to attenuate high frequency interference signals.

The circuit arrangement 37 has a voltage limiting unit 39 for limiting the electrical voltage between the two measuring connectors 40. For this purpose, the voltage limiting unit 39 has two series circuits of diodes D1, D2 and D4, D5 that are connected in the blocking direction to a voltage supply of the circuit arrangement 237. Respective middle connections of the series circuits are connected to the respective two measuring connectors 40. As a consequence, a region for the possible electrical potentials of the measuring connectors 40 is limited by the electrical potentials of the voltage supply.

The circuit arrangement 37 further has an amplifier unit 42 for amplifying the electrical voltage between the at least two measuring connectors 40 and the amplifier unit is connected to the voltage limiting unit 39. The amplifier unit 42 has two operation amplifiers 44, 45 that together form a differential amplifier. The differential amplifier is electrically connected via the filter unit 43 and the voltage limiting unit 39 to the measuring connectors 40. The amplifier unit 42 has an amplifier characteristic that results inter alia from the interaction of the operation amplifiers 44, 45 with further electronic components, in particular the resistors R7 to R13.

The circuit arrangement 37 has a comparison unit 41 that is connected to an output of the amplifier unit 42 for comparing the detected induced voltage with a voltage comparison value. The comparison unit 41 for this purpose has an operation amplifier 46 that realizes a comparator functionality. For this purpose, the operation amplifier 46 interacts with electrical resistors R20, R23, R32. The comparison unit 41 provides a sensor signal to a sensor signal connection 47 that is allocated to the detected induced voltage. With the aid of this signal, it is possible for the control unit 36 to ascertain whether an actuation of the door 4 by the user is present.

It is not apparent in the figures that the door opening apparatus 11 is configured in the closed state of the door 4 so as to be at least temporarily operated in a passive state and to switch into an active state in dependence upon the comparison. This dependency can be realized by means of the sensor signal at the sensor signal connection 47 in that this sensor signal is accordingly processed by the control unit 36. In particular, in the present case it is provided that the control unit 36 is configured so as to only apply the electrical voltage to the stator winding 30 in the active state. It is thereby possible for all components that are required to cause the door 4 to open to be switched off in order to save energy. This can relate inter alia to the inverter 33.

Furthermore, in an alternative embodiment the control unit 36, in particular the circuit arrangement 37, is configured alternatively or in addition so as to only detect the induced voltage in the passive state. In the active state, therefore all the components related to the detection of the induced voltage can be switched off in order to save energy.

Altogether, it is possible to achieve that the door opening apparatus 11 can simultaneously also be used as a sensor unit so as to detect the actuation by the user.

Figure 13:
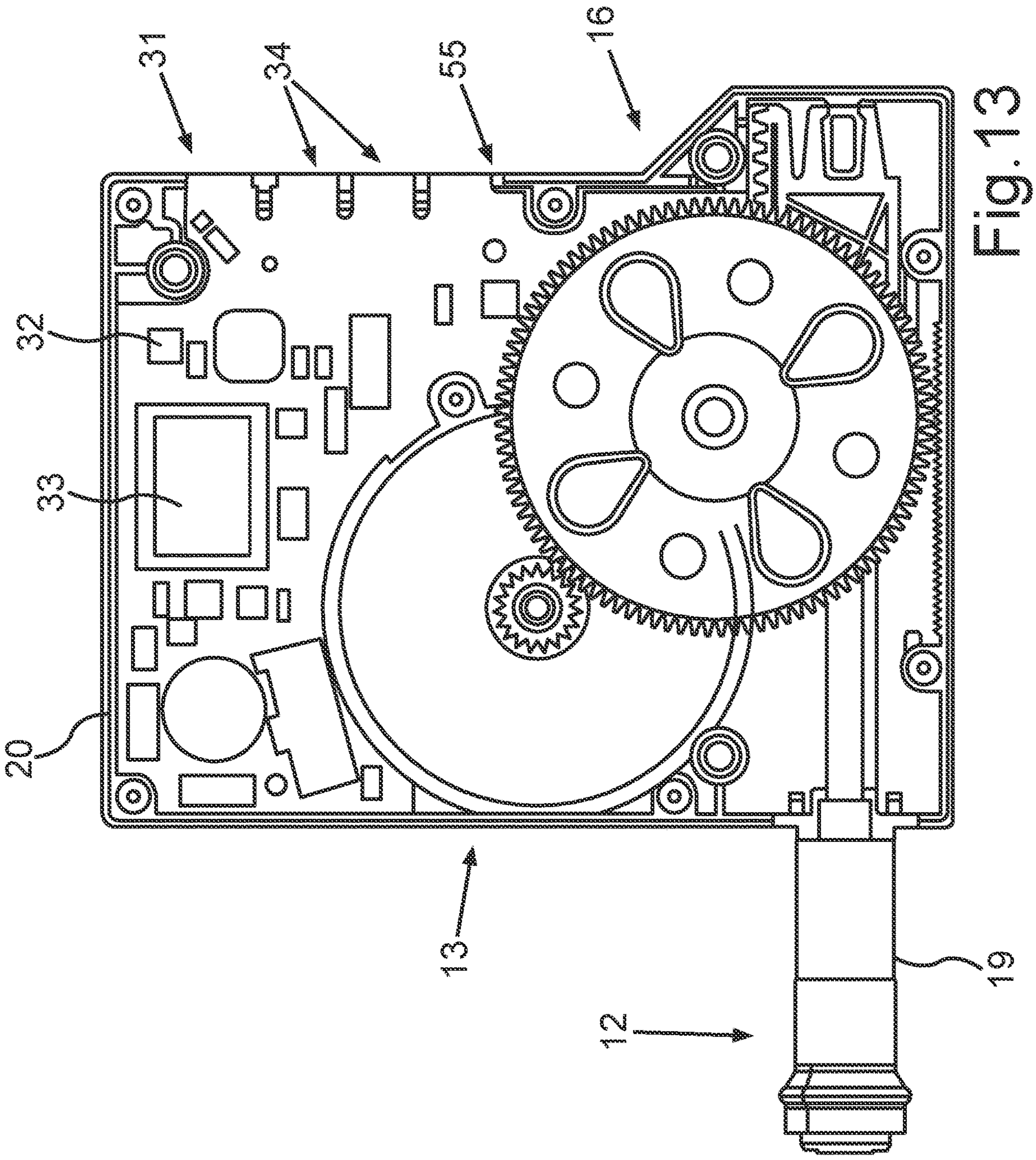
FIG. 13 is a schematic side view of a rear side of the door opening apparatus in accordance with FIG. 2, wherein a housing cover is removed.

As already explained above, the rotor 29 and the plunger 12 are mechanically coupled by means of the gearing mechanism 16 in order to be able to provide a mechanical coupling of the rotor 29, in terms of drive, to the plunger 12. The drive unit 36 further has a control unit of the inverter 33 having the inverter 33. Further, the stator winding 30 of the stator 28 is electrically coupled to the control unit of the inverter 33 of the door opening apparatus 11. The control unit of the inverter 33 is further coupled to the control facility 8 in terms of communication. As is apparent in FIG. 8, the control unit of the inverter 33 is arranged on a circuit board 32 in the housing 20 as an electronic hardware circuit. The drive unit 36 has the inverter 33 and the stator winding 30 is connected to the inverter. Consequently, in the intended operation it is possible to apply a suitable electrical voltage to the stator winding 30. FIG. 13 shows a rear side of the door opening apparatus 11 in accordance with FIG. 2, wherein a housing cover is removed.

The control unit of the inverter 33 in one embodiment further has the position sensor 31 as a sensor unit. The position sensor 31 is arranged on the circuit board 32 as an electronic hardware circuit by means of which an axial position of the plunger 12 can be detected. For this purpose—as is further explained below—within the scope of a further embodiment an induced electrical voltage of the stator winding 30 is evaluated if an electrical voltage is not applied to the stator winding 30 by the inverter.

The inverter 33 is configured so as in an active state to apply an electrical voltage to the stator winding 30 so as to cause the door 4 to open during a temporary bracing abutment of the plunger head 15 against the door inner side 14. The application of the electrical voltage leads to the fact that the electric machine 13 moves the plunger 12 in a motor operation in the direction of the door inner side 14 and consequently causes the door 4 to open. The housing 20 can be fastened to the body 10 of the household refrigeration appliance 1 as explained with the aid of FIGS. 4 to 7.

In the present case, it is provided that the door opening apparatus 11, in the present case the drive unit 36, has a mechanical bracing unit 17 as an energy store. The bracing unit 17 is configured, in particular in a passive state, so as to influence the plunger 12 using a force so as to mechanically brace the plunger head 15 against the door inner side 14 at least in the closed state of the door and at least in the absence of the application of the electrical voltage to the stator winding. In the closed state of the door 4, the plunger head 15 consequently rests against the door inner side 14 and touches or contacts this door inner side. In the passive state, an energy consumption of the door opening apparatus 11 is reduced because a sensor functionality only needs to be provided as is further explained below.

In accordance with the invention, the door opening apparatus 11 in the closed state of the door 4 is at least temporarily operated in a passive state in which the plunger 12 is influenced by the drive unit 36, in the present case the bracing unit 17 of the drive unit 36, in the direction of the door 4 using only a bracing force that is smaller than the opening force. During the passive state, it is possible by means of the position sensor 31 to detect a stroke of the plunger 12 and a sensor signal can be allocated to the detected stroke. The control unit 33 can compare the sensor signal that is allocated to the stroke with at least one first comparison value and in dependence upon the first comparison can trigger or perform a switch from the passive state into the active state. Due to the use of two alternately usable states, namely the active state and the passive state, it is possible to achieve that, in particular if the door is in the closed state, at least temporarily the passive state is taken up so that an energy consumption by the door opening apparatus 11 and consequently by the household refrigeration appliance 1 overall can be reduced. In the passive state, in particular the inverter 33 of the drive unit 36 does not need to be supplied with electrical energy because in this embodiment in the passive state in the present case the door 4 is not opened.

This can be achieved by virtue of the fact that the plunger 12 only needs to be influenced in the direction of the door 4 by the drive unit 36 using the bracing force. The bracing force is on the one hand smaller than the opening force that is required in order to move the door 4 into the at least in part opened state by means of the door opening apparatus 11. In the present case, it is provided that the bracing force is of such a magnitude that the plunger 12 or its plunger head 15 is braced against the door inner side 14 in the closed state of the door 4 with the result that the plunger can be adjusted in the case of actuation by the user, in other words can perform a stroke. The bracing force can thus be a particularly small force. On the other hand, in the passive state the control unit of the inverter 33 only needs to be supplied with energy in so far as the function of the detection or sensing of the stroke of the plunger 12 needs to be active. Further functionalities of the control unit of the inverter 33, such as for example the comparison functionality or the like, can consequently likewise be operated in a low consumption or a consumptionless state.

If a corresponding actuation by the user is determined at the door 4, a sensor signal is provided by means of which a switch is made from the passive state into the active state. In the active state, the drive unit 36 and in particular the inverter can be activated so that it is possible to cause the door 4 to open. The plunger 12 remains here in the extended state. As soon as the user closes the door 4, the door inner side 14 is moved against the plunger head 15 with the result that the plunger head 15 braces against the door inner side 14. Due to further pivoting to the fully closed state of the door 4 by the user for the plunger 12 a return stroke. The rotor 29 is driven accordingly via the gearing mechanism 16. This can be detected by means of the control unit 33 in that an induced electrical voltage is evaluated at the stator winding 30. It is consequently also possible to detect a closing of the door 4. As soon as the closing of the door 4 has been detected, the drive unit 36 is actuated so that the bracing force can be provided. As soon as the bracing force is available, a switch is made from the active state into the passive state.

Likewise in the figures it is not shown that the control unit 33 is configured so as, in the absence of the application of the electrical voltage to the stator winding 30 to detect an electrical voltage that is induced in the stator winding 30, to compare it with a comparison value that can be predetermined and so as to determine in dependence upon the comparison a manual actuation to open the door 4 by the user. The door opening apparatus 11 can consequently simultaneously also be used as a sensor unit so as to detect the manual actuation by the user.

In a further embodiment, the stator winding 30 of the stator 28 is electrically coupled to the control facility 8. In this embodiment, the control facility 8 preferably contains the control unit 36. In this embodiment, the control facility 8 is in part arranged on the circuit board 32 in the housing 20 as an electronic hardware circuit and preferably has the inverter 33 and where applicable also the control unit or the drive unit 36. The control facility 8 has the inverter 33 and the stator winding 30 is connected to the inverter. Consequently, in the intended operation it is possible to apply a suitable electrical voltage to the stator winding 30. The circuit board 32 in this embodiment preferably forms a part of the control facility 8 and further has an interface 34 and the circuit board can be coupled in terms of communication using the interface to a further part of the control facility 8, in particular in terms of signaling and energy. The control unit 8 is configured so as to apply an electrical voltage to the stator winding 30 so as to cause the door 4 to open during a temporary bracing abutment of the plunger head 15 against the door inner side 14. The application of the electrical voltage leads to the fact that the electric machine 13 moves the plunger 12 in a motor operation in the direction of the door inner side 14 and consequently causes the door 4 to open. The housing 20 can be fastened to the body 10 of the household refrigeration appliance 1 as explained with the aid of FIGS. 4 to 7.

In order to avoid that the plunger head 15 mechanically stops against the door inner side 14 as the door 4 is caused to open and consequently can cause noise and also where applicable wear and damage, in accordance with this embodiment in the present case it is provided that the door opening apparatus 11 has a mechanical bracing unit 17. The bracing unit 17 is configured so as to influence the plunger 12 using a force so as to mechanically brace the plunger head 15 against the door inner side 14 at least in the closed state of the door and at least in the absence of the application of the electrical voltage to the stator winding 30. In the closed state of the door 4, the plunger head 15 consequently rests against the door inner side 14 and touches or contacts this door inner side.

The plunger 12 is at least in part arranged in an axially movable manner in a sleeve 19 that is made from an elastic plastic and that is closed on the head side. The sleeve 19 is detachably connected on an end that lies opposite a head-side end region to a housing flange 22 of the housing 20. The plunger 12 is thereby essentially arranged in a fully protected manner. The sleeve 19 does not need to be formed entirely from the elastic material. On the contrary, it suffices if the head-side end region of the sleeve 19 is accordingly elastic with the result that a movement of the plunger 12 or the plunger head 15 is rendered possible.

Likewise in the figures it is not shown that the control facility 8 is configured so as in the absence of the application of the electrical voltage to the stator winding 30 to detect an electrical voltage that is induced in the stator winding 30, to compare it with a comparison value that can be predetermined and so as to determine in dependence upon the comparison a manual actuation to open the door 4 by the user. The door opening apparatus 11 can consequently simultaneously also be used as a sensor unit so as to detect the manual actuation by the user.

In accordance with a further embodiment, a position sensor 65 is arranged on the circuit board 32 as an electronic hardware circuit by means of which an axial position of the plunger 12 can be detected. For this purpose, a magnet 66 is arranged on the plunger 12 and the position of the magnet can be detected using a detecting unit 67, 68 of the position sensor 65. In the present case, it is provided that the magnet 66 and the position sensor 65 are arranged in such a manner that the closed position of the door 4 can be detected as the opening position. The position sensor 65 for this purpose is connected to the control unit 36 that evaluates a sensor signal that is provided by the position sensor 65 and determines in dependence upon this whether the door 4 is in the closed state.

The control unit 36 is configured to apply an electrical voltage to the stator winding 30 to cause the door 4 to open during a temporary bracing abutment of the plunger head 15 against the door inner side 14. The application of the electrical voltage leads to the fact that the electric machine 13 moves the plunger 12 in a motor operation via the gearing mechanism 16 in the direction of the door inner side 14 and consequently causes the door 4 to open. The housing 20 can be fastened to the body 10 of the household refrigeration appliance 1 as explained with the aid of FIGS. 4 to 7.

In the present case, it is provided that the door opening apparatus 11 has the mechanical bracing unit 17. The bracing unit 17 is configured to influence the plunger 12 using a force so as to mechanically brace the plunger head 15 against the door inner side 14 at least in the closed state of the door 4 and at least in the absence of the application of the electrical voltage to the stator winding 30. In the closed state of the door 4, the plunger head 15 consequently rests against the door inner side 14 and touches or contacts this door inner side.

The stator winding 30 is configured for an operation on a three-phase alternating voltage as an electrical voltage in that the stator winding has a respective phase winding for each of the three phases of the alternating voltage. The three measuring connectors 40 are in each case connected to precisely one of the phase windings.

It is not apparent in the figures that the door opening apparatus 11 is configured in the closed state of the door 4 so as to be at least temporarily operated in a passive state and to switch into an active state in dependence upon a detection of an actuation of a user. In particular, in the present case it is provided that the control unit 36 is configured so as to only apply the electrical voltage to the stator winding 30 in the active state. It is thereby possible for all components, which are required to cause the door 4 to open, to be switched off to save energy. This can relate inter alia to the inverter 33. The passive state can be taken up in dependence upon the detection of the closed state of the door 4. If an actuation by the user is determined, it is possible in dependence upon this to switch from the passive state into the active state. It is then possible to cause the door 4 to open in the active state.

Altogether, it is possible to achieve that the door opening apparatus 11 can simultaneously also be used as a sensor unit so as to detect the actuation by the user and, as is further explained below, so as to determine an opening state of the door 4.

Figure 14:
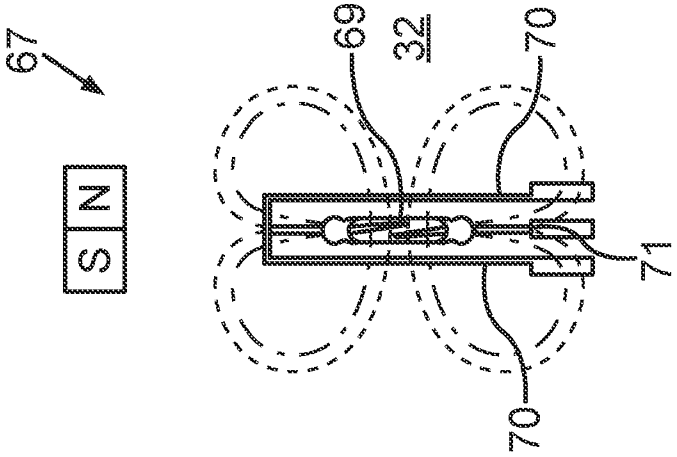
FIG. 14 is a schematic circuit diagram view of a first embodiment for a detecting unit of a position sensor having a reed switch.

FIG. 14 shows a schematic circuit diagram view of a first embodiment for the detecting unit 67 of the position sensor 65 having a reed switch 69. In FIG. 14, only the part of the circuit board 32 that relates to the detecting unit 67 is shown. The detecting unit 67 is arranged on the circuit board 32. A conductor track 70 that is configured as essentially U-shaped is apparent and the conductor track has an opening that is oriented downward in FIG. 14. The reed switch 69 is arranged essentially surrounded by the conductor track 70 within the U-shape. A first upper connector of the reed switch 69 is electrically connected to the conductor track 70 in the end that lies opposite the opening of the U-shape. A second lower connector of the reed switch 69 is electrically connected to a conductor track 71 that is arranged in the opening region of the opening of the U-shape. The conductor tracks 70, 71 are connected to the control unit 36 that provides an accordingly configured evaluating unit. It is possible by means of the evaluating unit for the control unit 36 to evaluate the sensor signal of the detecting unit 67 in order to determine whether the door 4 is in the closed state.

In the present embodiment, it is further provided that the magnet 66 is arranged with its magnetic poles oriented towards the detecting unit 67, if the plunger 12 is braced against the door inner side 14 in the case of the closed door 4. The detecting unit 67 is arranged in such a manner that the reed switch 69 in this state is arranged with its longitudinal axis oriented towards the magnet 66. It is thereby possible for the closed state of the door 4 to be reliably and precisely detected. A small stroke of the plunger 12 can consequently already be detected in order to determine that the door 4 is no longer in the closed state.

Figure 15:
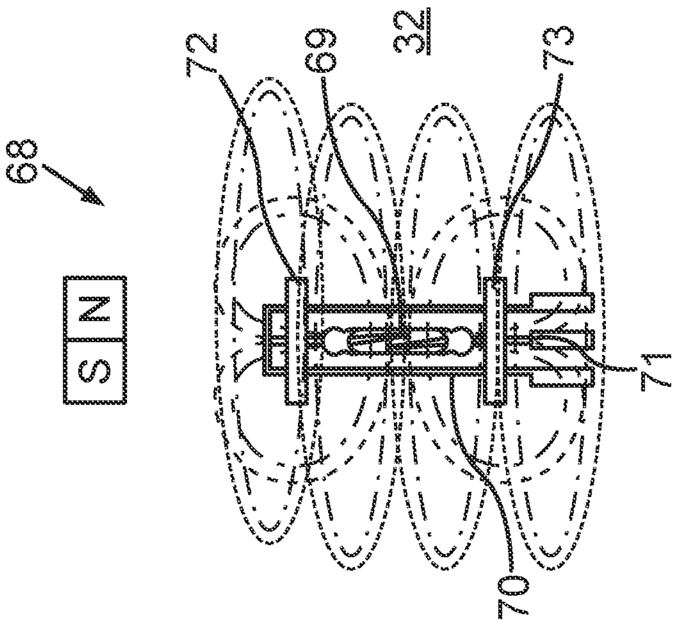
FIG. 15 is a schematic circuit diagram view of a second embodiment for a detecting unit of a position sensor having a reed switch.

FIG. 15 shows a second embodiment of a detecting unit 68 and the construction and design of the detecting unit is based on the detecting unit 67 which is why in addition reference is made to the statements made with regard to FIG. 14. Only the differences are explained below.

In contrast with the detecting unit 67 in accordance with FIG. 14, the detecting unit 68 has two metal cylinders 72, 73 that in the present case are formed from a copper alloy. The metal cylinder 72 is electrically connected to the first upper contact of the reed switch 69. A longitudinal axis of the metal cylinder 72 is oriented transverse with respect to a longitudinal axis of the reed switch 69. The metal cylinder 72 in the present case is electrically connected approximately centrally in relation to its longitudinal extent on the first upper contact of the reed switch 69. The metal cylinder 72 does not have any electrical contact to the conductor track 71.

The metal cylinder 73 is further electrically connected to the second lower contact of the reed switch 69 and namely in such a manner that there is no electrical connection to the conductor track 70. The metal cylinder 73 is consequently arranged in an electrically insulated manner with respect to the conductor track 70. A longitudinal axis of the metal cylinder 73 is also oriented here in a transverse manner with respect to the longitudinal axis of the reed switch 69. The metal cylinder 73 in the present case is likewise electrically connected approximately centrally in relation to its longitudinal extent to the second lower contact of the reed switch 69.

The metal cylinders 72, 73 and also the reed switch 69 are arranged lying on a surface of the circuit board 32. With this arrangement it is possible to achieve an improved magnetic field orientation with the result that the function of the detecting unit 68 can be further improved.

It is further possible for the reed switch 69 and/or the metal cylinders 72, 73 to provide passage openings in the circuit board 32 in which the reed switch 69 or the metal cylinders 72, 73 can be arranged in an accordingly oriented manner. As a consequence, the aspects that relate to the function can be better taken into consideration as required.

The exemplary embodiments are used merely to explain the invention and are not to limit this invention. Furthermore, the embodiments, in particular individual features or feature groups of the above-described embodiments, can naturally be combined with one another in an almost arbitrary manner in order to arrive at further embodiments in accordance with the invention.

The following is a summary list of reference numerals and the corresponding structure used in the above description of the invention.

LIST OF REFERENCE CHARACTERS

1 Household refrigeration appliance
2 Interior container
3 Interior space
4 Door
5 Door tray
6 Shelf
7 Drawer
8 Control facility
9 Control unit
10 Body
11 Door opening apparatus
12 Plunger
13 Rotating electric machine
14 Door inner side
15 Plunger head
16 Gearing mechanism
17 Bracing unit
18 Longitudinal axis
19 Sleeve
20 Housing
21 Magnetizable bracing region
22 Housing flange
23 Magnet
24 Spiral spring
25 Access opening
26 Connecting unit
27 Holding element
28 Stator
29 Rotor
30 Stator winding
31 Position sensor
32 Circuit board
33 Inverter
34 Interface
35 Stop
36 Drive unit, control unit
37 Circuit arrangement
38 Power supply unit
39 Voltage limiting unit
40 Measuring connectors
41 Comparison unit
42 Amplifier unit
43 Filter unit
44 Operation amplifier
45 Operation amplifier
46 Operation amplifier
47 Sensor signal connector
55 Control unit
57 Apparatus
58 Graph
59 Graph
60 Graph
61 Graph
62 Graph
63 Graph
65 Position sensor
66 Magnet
67 Detecting unit
68 Detecting unit

69 Reed switch
70 Conductor track
71 Conductor track
72 Metal cylinder
73 Metal cylinder
C8, C10, C14, C21 Capacitor
D1, D2, D4, D5 Diode
R7 to R14, R16, R20, R23, R32 Resistor

The invention claimed is:

1. A door opening apparatus for causing a door of a household appliance to open, the door opening apparatus comprising:

a plunger disposed in a direction of a longitudinal axis of said plunger, wherein the longitudinal axis of said plunger is oriented in a transverse manner with respect to a door inner side in a closed state of the door, and on a side adjacent said door said plunger having a first plunger end with a plunger head;

a rotating electric machine having a rotor disposed rotatably relative to a stator having a stator winding;

a gearing mechanism mechanically coupled to said rotor and said plunger for mechanically coupling said rotor to said plunger;

a controller electrically coupled to said stator winding of said stator and configured to apply an electrical voltage to said stator winding to assist an opening of the door at least during a temporary bracing abutment of said plunger head against the door inner side;

a mechanical bracing unit configured so as to influence said plunger using a force so as to mechanically brace said plunger head against the door inner side at least in the closed state of the door and at least in an absence of an application of the electrical voltage to said stator winding; and a circuit configuration electrically coupled to said stator winding for detecting an induced voltage of said stator winding in the absence of the application of the electrical voltage to said stator winding.

2. The door opening apparatus according to claim 1, wherein said circuit configuration has at least two measuring connectors that are connected to said stator winding.

3. The door opening apparatus according to claim 2, wherein said circuit configuration has a voltage limiter for limiting an electrical voltage between said at least two measuring connectors.

4. The door opening apparatus according to claim 2, wherein said circuit configuration has an amplifier unit for amplifying an electrical voltage between said at least two measuring connectors.

5. The door opening apparatus according to claim 4, wherein said amplifier unit has a control connection for activating an amplification.

6. The door opening apparatus according to claim 5, wherein said controller influences said control connection using an activation signal at least temporarily in the absence of the application of the electrical voltage to said stator winding.

7. The door opening apparatus according to claim 4, wherein said amplifier unit has a differential amplifier with input connectors, said input connectors of said differential amplifier are electrically coupled to said at least two measuring connectors.

8. The door opening apparatus according to claim 4, wherein:

said stator winding is configured for an operation at a multi-phase alternating voltage as the electrical voltage;

said stator winding has at least one respective phase winding for each phase of the multi-phase alternating voltage; and said at least two measuring connectors are connected to precisely one of said phase windings or to two different said phase windings.

9. The door opening apparatus according to claim 4, wherein said circuit configuration has a filter unit for filtering the induced voltage that is detected between said at least two measuring connectors.

10. The door opening apparatus according to claim 1, wherein said circuit configuration has a comparison unit for comparing a detected induced voltage with a voltage comparison value.

11. The door opening apparatus according to claim 10, wherein the door opening apparatus is configured in the closed state of the door so as to be at least temporarily operated in a passive state and to switch into an active state in dependence upon a comparison.

12. The door opening apparatus according to claim 11, wherein said controller is configured to only apply the electrical voltage to said stator winding in the active state.

13. The door opening apparatus according to claim 11, wherein said circuit configuration is configured to only detect the induced voltage in the passive state.

* * * * *